United States Patent
Li et al.

(10) Patent No.: US 11,677,803 B2
(45) Date of Patent: Jun. 13, 2023

(54) SYSTEMS AND METHODS FOR OPTIMIZATION OF TRANSMISSION OF REAL-TIME DATA VIA NETWORK LABELING

(71) Applicant: Agora Lab, Inc., Santa Clara, CA (US)

(72) Inventors: Wei Li, Shanghai (CN); Bin Zhao, Shanghai (CN)

(73) Assignee: Agora Lab, inc., Santa Clara, CA (US)

( * ) Notice: Subject to any disclaimer, the term of this patent is extended or adjusted under 35 U.S.C. 154(b) by 0 days.

(21) Appl. No.: 17/742,562

(22) Filed: May 12, 2022

(65) Prior Publication Data
US 2022/0272142 A1 Aug. 25, 2022

Related U.S. Application Data

(63) Continuation of application No. 17/463,449, filed on Aug. 31, 2021, now Pat. No. 11,363,089, which is a
(Continued)

(51) Int. Cl.
*H04L 65/80* (2022.01)
*H04L 65/403* (2022.01)
(Continued)

(52) U.S. Cl.
CPC ............ *H04L 65/80* (2013.01); *H04L 12/18* (2013.01); *H04L 12/1827* (2013.01);
(Continued)

(58) Field of Classification Search
CPC ..... H04L 65/80; H04L 65/403; H04L 43/062; H04L 12/18; H04L 12/1827;
(Continued)

(56) References Cited

U.S. PATENT DOCUMENTS 7,734,775 B2 6/2010 Barnett et al.
9,397,922 B1 7/2016 Collins
(Continued)

*Primary Examiner* — Harry S Hong
(74) *Attorney, Agent, or Firm* — The Law Offices of Konrad Sherinian, LLC; Depeng Bi

(57) ABSTRACT

The present invention relates to systems and methods for network labeling in order to enhance real time data transfers. A network for a real time data transfer is identified and predictive models for network performance are compared against to determine if the network is suitable for the data transfer. If so, then the real time data transfer may be completed as expected. However, if the network is predicted to be unsuitable for transmission an alternate means for connection may be suggested. The alternate suggestion may include delaying the data transfer until the network is expected to be in better conditions, connecting to another access point in the network, or switching to another network entirely. During the data transfer, the quality of the network is monitored in order to update the predictive models for the network's quality. Identifiers for the network may be utilized to keep track of the networks. Network signal strength, signal pollution and time may also be tracked in order to identify patterns in the network's performance.

15 Claims, 17 Drawing Sheets

Related U.S. Application Data continuation of application No. 16/565,227, filed on Sep. 9, 2019, now Pat. No. 11,159,598, which is a continuation of application No. 15/140,418, filed on Apr. 27, 2016, now Pat. No. 10,412,145, which is a continuation-in-part of application No. 14/500,960, filed on Sep. 29, 2014, now Pat. No. 9,479,412.

(60) Provisional application No. 62/175,194, filed on Jun. 12, 2015, provisional application No. 62/018,522, filed on Jun. 27, 2014, provisional application No. 62/018,520, filed on Jun. 27, 2014.

(51) Int. Cl.
| | |
|---|---|
| *H04L 43/062* | (2022.01) |
| *H04L 12/18* | (2006.01) |
| *H04L 41/14* | (2022.01) |
| *H04L 45/12* | (2022.01) |
| *H04L 47/722* | (2022.01) |
| *H04L 65/4038* | (2022.01) |
| *H04M 3/22* | (2006.01) |
| *H04M 7/00* | (2006.01) |
| *H04L 43/55* | (2022.01) |
| *H04L 43/16* | (2022.01) |
| *H04L 43/0829* | (2022.01) |
| *H04L 43/0852* | (2022.01) |
| *H04L 43/087* | (2022.01) |
| *H04L 47/283* | (2022.01) |
| *H04M 1/24* | (2006.01) |
| *H04M 1/253* | (2006.01) |
| *H04L 51/234* | (2022.01) |
| *H04L 101/622* | (2022.01) |

(52) U.S. Cl.
CPC ........ *H04L 12/1831* (2013.01); *H04L 41/145* (2013.01); *H04L 43/062* (2013.01); *H04L 43/55* (2022.05); *H04L 45/123* (2013.01); *H04L 47/722* (2013.01); *H04L 65/403* (2013.01); *H04L 65/4038* (2013.01); *H04M 3/2236* (2013.01); *H04M 7/0084* (2013.01); *H04L 43/087* (2013.01); *H04L 43/0829* (2013.01); *H04L 43/0858* (2013.01); *H04L 43/16* (2013.01); *H04L 47/283* (2013.01); *H04L 51/234* (2022.05); *H04L 2101/622* (2022.05); *H04M 1/24* (2013.01); *H04M 1/2535* (2013.01); *H04M 7/006* (2013.01); *H04M 2250/62* (2013.01); *H04M 2250/74* (2013.01)

(58) Field of Classification Search
CPC . H04L 12/1831; H04L 41/145; H04L 45/123; H04L 47/722; H04L 65/4038; H04L 43/55; H04L 2101/622; H04L 43/16; H04L 43/0829; H04L 43/0858; H04L 43/087; H04L 47/283; H04L 51/234; H04M 3/2236; H04M 7/0084; H04M 7/006; H04M 1/24; H04M 1/2535; H04M 2250/62; H04M 2250/74
USPC .................................................. 370/252, 253
See application file for complete search history.

(56) References Cited

U.S. PATENT DOCUMENTS

| | | | |
|---|---|---|---|
| 11,363,089 B2* | 6/2022 | Li | ............... H04L 45/123 |
| 2002/0131604 A1 | 9/2002 | Amine | |
| 2005/0261860 A1 | 11/2005 | Lobig | |
| 2005/0265321 A1 | 12/2005 | Rappaport et al. | |
| 2006/0153100 A1 | 7/2006 | Dube | |
| 2007/0195747 A1 | 8/2007 | Attar et al. | |
| 2011/0205915 A1 | 8/2011 | Skrabutenas et al. | |
| 2011/0235541 A1 | 9/2011 | Choudhury et al. | |
| 2012/0014252 A1 | 1/2012 | Martin | |
| 2012/0303413 A1 | 11/2012 | Wang | |
| 2013/0346578 A1 | 12/2013 | Varki et al. | |
| 2014/0044246 A1 | 2/2014 | Klemm et al. | |
| 2014/0219112 A1 | 8/2014 | Kherani et al. | |
| 2015/0271026 A1 | 9/2015 | Meduri | |
| 2015/0381814 A1 | 12/2015 | Zhao et al. | |
| 2016/0028599 A1 | 1/2016 | Vasseur et al. | |
| 2016/0034823 A1 | 2/2016 | Farkas | |
| 2016/0036673 A1 | 2/2016 | Meirosu | |
| 2016/0094621 A1 | 3/2016 | Wolfe | |
| 2016/0248678 A1* | 8/2016 | Zhao | ............... H04L 67/101 |
| 2016/0254983 A1* | 9/2016 | Zhao | ............... H04L 45/123 370/252 |
| 2016/0254996 A1* | 9/2016 | Zhao | ............... H04L 43/55 370/241 |
| 2016/0315993 A1 | 10/2016 | Li et al. | |
| 2017/0111233 A1 | 4/2017 | Kokkula | |
| 2022/0046075 A1* | 2/2022 | Li | ............... H04L 45/123 |

* cited by examiner

SYSTEMS AND METHODS FOR OPTIMIZATION OF TRANSMISSION OF REAL-TIME DATA VIA NETWORK LABELING

CROSS REFERENCE TO RELATED APPLICATIONS

This Continuation application claims the benefit of U.S. application Ser. No. 17/463,449, filed on Aug. 31, 2021, of the same title, recently allowed, which is a Continuation application claims the benefit of U.S. application Ser. No. 16/565,227, filed on Sep. 9, 2019, of the same title, now U.S. Pat. No. 11,159,598, issued Oct. 26, 2021 which is a Continuation application claims the benefit of U.S. application Ser. No. 15/140,418, filed on Apr. 27, 2016, of the same title, now U.S. Pat. No. 10,412,145, issued Sep. 10, 2019 which application claims the benefit of and is a Continuation-in-part of U.S. application Ser. No. 14/500,960 filed Sep. 29, 2014 entitled "Systems and Methods for Improved Quality of a Visualized Call Over Network through Pathway Testing", now U.S. Pat. No. 9,479,412 issued Oct. 25, 2016, which claims the benefit of U.S. Provisional application Nos. 62/018,520 and 62/018,522 both filed Jun. 27, 2014, expired. Also, U.S. application Ser. No. 15/140,418 claims the benefit of U.S. Provisional application No. 62/175,194 filed Jun. 12, 2015, expired, entitled "Systems and Methods For Improved Communication Packet Delivery Over A Public Network", which all applications and patents are incorporated herein in their entirety by this reference.

BACKGROUND

The present invention relates to systems and methods for improving the quality of real time data transmission through network testing and labeling. Such systems and methods enable more efficient data transfers over networks than is currently available due to better network fidelity. This results in the ability to have more effective real-time data transfers, such as call over network (CON) conversations, streaming real time video or other real time data.

Currently, a number of platforms are available for call over network communications. These typically include audio and/or video calling capabilities that rely upon the internet (or other suitable network) in order to enable communications between two or more participants. Examples of current CON systems include Vonage, Skype, WebEx, and Facetime, for example. Each of these systems have some differentiating features, but predominantly operate via scheduling or otherwise initiating a call, and then transmitting and receiving audio and/or video material via the internet (and often other networks as well). In some of the more sophisticated CON systems, such as WebEx, participants additionally have the capability to share their computer desktop, and further, pass this functionality to other participants.

While these CON systems have done a lot to enhance causal communications, the larger impact of CON systems is arguably on in relation to how businesses operate. Traditionally, in-face meetings were required to fully engage other business partners. The conference call was available, but was typically costly when used for international calls since they operate over traditional telecommunications infrastructures. These newer CON systems have further increased how easily remote participants can communicate effectively; however, there are still a number of problems that tend to plague existing CON systems.

For example, proper connectivity of all users in a CON system is routinely an issue. Often, one participant can have trouble joining or hearing without the other participant's knowledge. Connectivity issues are often sources of inefficiencies for call over network communications. Indeed, one of the largest problems facing CON systems is the fact that data is typically transmitted via the internet, which is a "best effort network". Best effort network means that the data is transmitted with the best timing and quality reasonably possible. However, the data is transmitted over often torturous pathways, in sub-optimal conditions. As such, often timing and/or quality of the transmitted data are negatively impacted. Given that audio and video communications are done in real-time, these types of data transfers are very susceptible to transmission delays and/or packet loss.

In addition to the inherent deficiencies of the internet backbone of these CON systems, there may be localized deficiencies in the network at either end of the network chain. For example, a particular router may be poorly located, have blind spots, or may suffer from periodic signal pollution from other sources. Likewise, the end portion of the network may experience periods of unusually high traffic or other conditions that result in a sub-optimal transmission path.

Traditional call over network systems handle this reduction in call quality and/or timing by reducing high data demanding communications. For example, in Skype, the video portion of the call may have a reduced quality, or may be halted altogether. Additionally, these existing systems simply drop the call if the timing and/or quality gets below a threshold. The thinking behind these dropped calls is that the inconvenience of not being able to communicate is less burdensome than a bad connection.

While there is some merit to this business model, there are some circumstances where communication is required, even in sub-optimal network conditions. This can be especially true where a number of participants are engaging in a conference call. Here schedules are often difficult to coordinate, and as such the need to communicate via that medium, and at that time, are magnified.

Typically, when the participants are located relatively near one another, in a location with a decent internet backbone, these measures are sufficient to ensure basic levels of communication quality. However, when participants are more remotely located (for example on different continents), these measures may simply be insufficient in order to produce decent communication.

Indeed, for a decent voice over internet protocol (VoIP) call, total latency should be less than 400 ms, and have a packet loss of less than 2%. In contrast, the typical jitter for data between China and the United States can vary from a few hundred milliseconds to a few seconds. This is in addition to a 100-160 ms latency. Packet loss between China and the United States often varies from 0 to 100%. Clearly, the internet infrastructure is sub-optimal for communications from China to the US. Other global locations vary in their suitability for communication as well.

All of these drawbacks to existing CON systems require that callers repeat information more often, and reduce efficiency for all members. Moreover, in the extreme situation of a badly compromised network connection, existing CON systems are rendered inoperable. Impatient participants that have a good connection may quickly lose interest in the conversation as the pace seems unbearably slow, or as the calls are dropped. Other participants may leave the call missing much of what has been communicated. Often these participants don't want to ask for clarification too often due to respect for the numerous other participants' time. In the case of dropped calls, important communication may simply never happen.

It is therefore apparent that an urgent need exists for systems and methods for improving real time packet delivery over a network in order to improve the quality of a call over network. Such systems and methods provide network monitoring and labeling, in addition to network optimizations such as last mile optimizations, in order to provide superior connectivity.

SUMMARY

To achieve the foregoing and in accordance with the present invention, systems and methods for network labeling in order to enhance real time data transfers are provided. Such systems and methods enable enhanced quality calling over the internet even across very large distances by ensuring local access points are optimized for in addition to other network performance optimization measures.

In some embodiments, the systems and methods include a network data collector for identifying a network for a real time data transfer, a database for storing information on networks, and a modeler for generating predictive models for the networks performance. A network labeler determines if a network the user is connecting to is suitable for real time data transfers. If so, then the real time data transfer may be completed as expected. However, if the network is predicted to be unsuitable for transmission an alternate means for connection may be suggested. The alternate suggestion may include delaying the data transfer until the network is expected to be in better conditions, connecting to another access point in the network, or switching to another network entirely (such as a cellular network or Public Switched Telephone Network (PSTN)).

During the data transfer, the quality of the network is monitored in order to update the predictive models for the network's quality. Identifiers for the network such as BSSIP of a router and MAC addresses may be utilized to keep track of the networks. These identifiers may be hashed for privacy reasons. In addition to identifiers, network signal strength, signal pollution and time may also be tracked in order to identify patterns in the network's performance.

Accuracy statistics may also be generated corresponding to the predictive models of the network's performance. These accuracy statistics can be used to determine if the model is sufficiently robust to make a determination of whether to use the network or not.

Such a system for labeling networks may further be enhanced by then leveraging a last mile optimization to further ensure the best servers are being utilized for signal propagation. In a last mile optimization pseudo-packets are sent to a last mile optimizer located multiple best servers to identify a single best edge server for transmission. Feedback is provided from each of these servers in order to identify which is best. Then a series of transporter algorithms may be applied to the pseudo-packets to determine how best to transmit the data.

Jitter, latency and packet loss are measured for the transmitted pseudo-packets to determine quality of service for each of the edge servers being measured. The server with the best balance of low latency, low jitter and low loss is used to select the 'best server' and decide which transporter algorithms to apply.

Note that the various features of the present invention described above may be practiced alone or in combination. These and other features of the present invention will be described in more detail below in the detailed description of the invention and in conjunction with the following figures. Further in accordance with the present teachings is a system for improving real time packet delivery over a network in order to improve the quality of a call over the network. The system includes a network optimization application adapted to be executed by a processor on a plurality of communication devices, the plurality of communication devices including a first communication device, each communication device within the plurality of communication devices having an interface and instrumentation, the network optimization application physically or logically coupled to the interface and instrumentation, the interface and instrumentation having a display, a speaker, a microphone, an input device and a network connection interface for accessing the network, wherein the network optimization application corresponds to an IP address; a general optimizer adapted to be deployed across a set of internet data center servers, the general optimizer including an access controller, a server selection optimizer, a load balancer, wherein the general optimizer is in a control layer; a last mile optimizer adapted to be deployed on each server within a set of edge servers, wherein the last mile optimizer is in a transport layer, each edge server within the set of edge servers adapted to transmit data over the network; a server relay adapted to be deployed on each server within the set of edge servers; and wherein the access controller is adapted to receive, from the server selection optimizer, a list of servers with the set of edge server; the load balancer is adapted to select a list of several best servers from the list of servers based on relative loads of each server within the list of servers; the access controller is adapted to send the list of several best servers to the network optimization application running on the first communication device; the network optimization application running on the first communication device is adapted to interact, via packet exchange, with the last mile optimizer running on each edge server within the list of several best servers to select a best server from the list of several best servers for a call over the network between the first communication device and another communication device; and the network optimization application running on the first communication device is adapted to interact with the server relay running on the best server to determine a suitable transporter algorithm for initiating a pathway for transmission for the call via the best server. The server selection optimizer is a regional optimizer and the list of servers are located within a same region as the first communication device. The server selection optimizer is a geo optimizer and the list of servers are closest edge servers within the set of edge servers to the first communication device. The server selection optimizer determines the list of servers based on the IP address similarity with the IP address of the first communication device. The server selection optimizer is an internet service provider (ISP) optimizer, wherein the access controller is adapted to determine an ISP based the IP address of the first communication device by querying an IP database; and the server selection optimizer is adapted to select edge server within the ISP as the list of servers. The network optimization application determines the suitable transporter algorithm with testing algorithms that include at least one of retransmission on lost, FEC, simultaneous path, very low bitrate encoding, sending of multiple voice frames in one packet, adaptive jitter buffer, and PLC. The network optimization application running on the first communication device selects the best server by sending test packets to each server within the list of several best servers and monitoring a response. The monitoring a response determines packet loss rate, jitter and packet latency. The monitoring a response determines bandwidth. The suitable transporter algorithm indicates an optimized packet size. The optimized packet size is a largest packet available when below a threshold packet loss rate and below a threshold bandwidth. The network optimization application running on the first communication device is further adapted to renegotiate an updated data packet size based upon a change in conditions of the pathway for transmission. The network optimization application running on the first communication device is further adapted to interact with the last mile optimizer on each server within the set of edge servers to determine a second best server while the call is in progress. The network optimization application running on the first communication device is further adapted to switch to the second best server when the pathway for transmission has a failure. The network optimization application running on the first communication device is further adapted to switch to the second best server when the pathway for transmission has a packet loss rate of above 2% or a latency above 400 ms.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
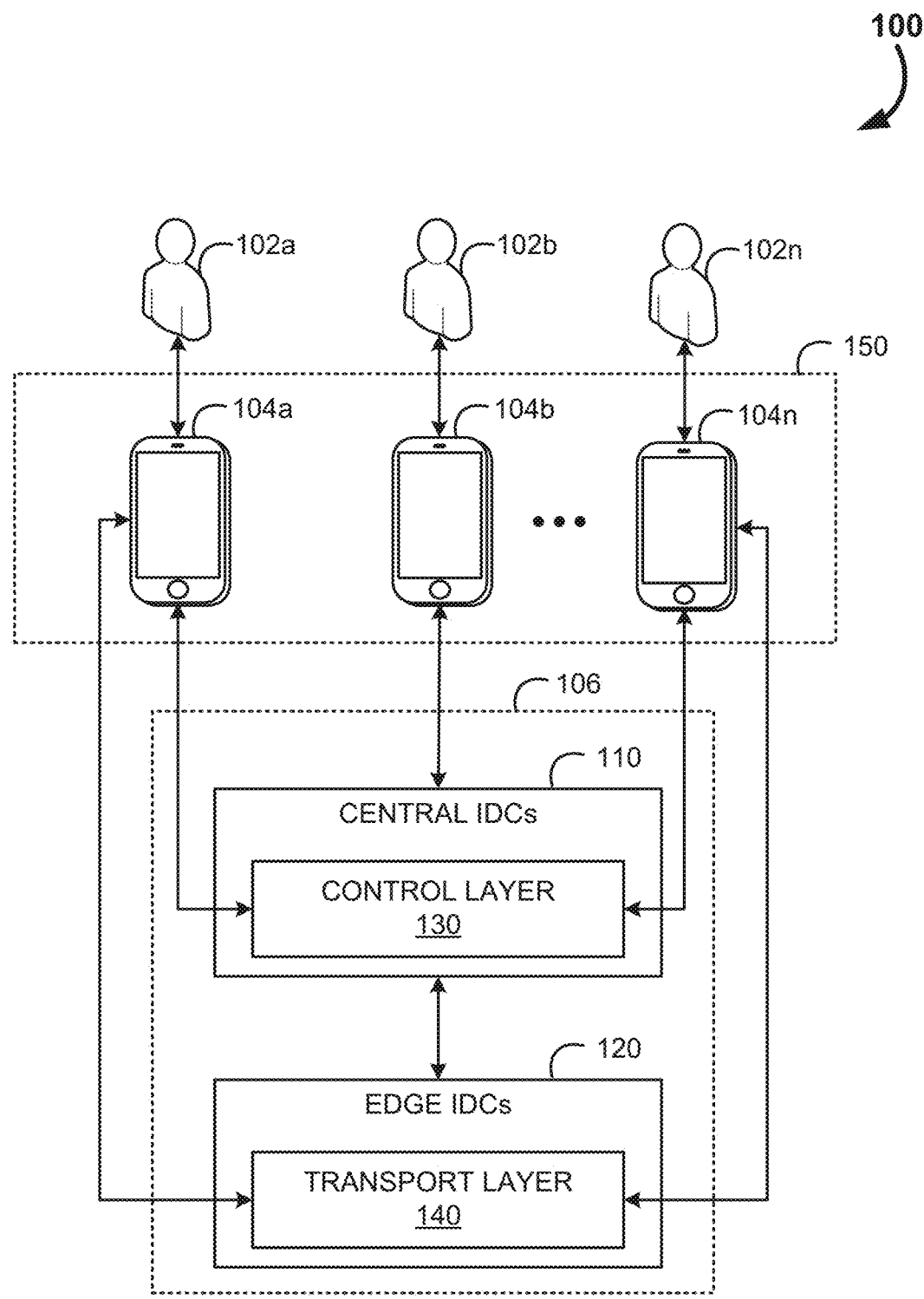
FIG. 1 is an example block diagram of a system for improving real-time data packet delivery, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The presently disclosed systems and methods are directed toward the improved delivery of real-time data packets over a network; and particularly with the enhancement of communication packets over the internet. As previously noted, a number of current CON systems are available. Each of these systems has some benefits compared against one another, but all of them fail to provide the improved call quality features and data transmission optimizations disclosed herein. For the sake of clarity, the presently disclosed call quality functions will be described as an integrated CON standalone system. However, despite this portrayal of the CON system with these quality features, it is also considered within the scope of this disclosure that the functionalities disclosed herein could be incorporated into an add-on module, capable of overlaying existing CON architectures. In such a way, callers could continue to rely upon Skype, for example, due to brand loyalty and robust back end servers, and yet still enjoy the added quality enhancements disclosed herein. As such, an overlay application for an existing CON system, or a fully integrated CON system are considered equally covered by the present disclosure.

The term "device" as used herein is intended to refer to any device to which a participant may communicate with via the CON. Often these devices are also referred to as "mobile devices" as one focus of such communication is with devices such as laptops, cell phones, and tablets. However, it should be understood that any device where communication is desired falls within the scope of the term "device".

Also note that the term "participant" is utilized to describe the user of a device who is engaging in a call. It is likewise understood that the terms "user", "caller", and "member" are likewise often utilized interchangeably with the term "participant".

Moreover, while the term "call" is utilized, and often referred to in relation to audio communication, the term "call" is intended to be broad enough to encompass any audio and/or video and/or real time data. Thus, for the sake of clarity, many of the examples will center on audio only conference type calling, but video calls, or calls whereby digital material or desktop screenshots are shared, or any real-time data transfers, are equally intended to be within the scope of the term "call".

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Systems for Improving Communication Packet Delivery Over a Network

To facilitate this discussion, FIG. 1 provides an example schematic block diagram for a system for improved communication packet delivery for enhanced call over network (CON) quality, shown generally at 100. In this example block diagram, a number of participants 102a-n are illustrated engaging a plurality of devices 104a-n. Note that for a successful call, only two devices, and a minimum of two participants 102a-n are required. However, as will be elucidated below, in conjunction with examples and embodiments, call quality improvements are especially helpful as the number of participants 102a-n increases due to the increased number of data pathways being relied upon.

Note that while a one-to-one ratio of participant to device is illustrated for the sake of simplicity, it is entirely within the scope of this disclosure that there may be multiple participants 102a-n on any one device if they are concurrently located.

As previously noted, devices 104a-n may refer to any number of device types, not only cell phones as illustrated herein. In some embodiments, the systems and methods disclosed herein may be particularly formatted in order to operate on such mobile devices, since call quality and ability to understand may be most heavily compromised on such mobile devices; however, in alternate embodiments the systems and methods of communication packet delivery improvement disclosed herein are equally able to be implemented on a wide array of devices (i.e., laptop and desktop computers, game consoles, dedicated teleconferencing equipment, etc.).

The devices 104a-n collectively make up an application layer 150 of the present system for packet delivery improvement. These devices 104a-n include applications capable of performing optimizations of last mile delivery The devices 104a-n the couple to one another via a network 106. The network 106 most typically includes the internet, but may also include other networks such as a corporate WAN, cellular network, or combination thereof, for example. The network 106 may consist of multiple central data centers 110, and a larger number of edge data centers 120. When the network 106 is the public internet, the data centers are typically referred to as internet data centers (IDCs). There are a handful of central IDCs 110 already distributed across the globe. There are many more edge IDCs 120 likewise distributed. IDC distribution typically follows population centers and internet usage rates.

As previously disclosed, one of the largest problems facing CON systems is the fact that data is typically transmitted via the internet, which is a "best effort network". Best effort network means that the data is transmitted with the best timing and quality reasonably possible. As such, the timing and/or quality of the data received are typically compromised.

Typically, data transferred over the internet can be repaired as retransmissions are received, or as late packets are re-integrated. However, in the context of human discussions or any other real-time data transfer, waiting for late packets, or packet retransmission, is often undesirable due to the latency caused in the speech/data latency. People naturally wait a very short time after they finish speaking before they become impatient and expect some kind of response. The period of time varies by individual, and by culture; however, typically 200-800 ms delay between the end of a speaker talking, and a response causes the speaker to wonder if they were heard. If there is a response delay of longer than 200-800 ms, the speaker will often repeat information, or query the other participants' whether they heard what was spoken. This makes sense in face to face communication, but in circumstances where there are network delays, this repetition often causes speakers to talk over one another, or otherwise miscommunicate.

Given current internet infrastructure conditions, latency between China and the US exists at approximately 100-150 ms, with a jitter lasting a few hundred milliseconds to a few seconds in length. Packet loss numbers are even more unpredictable: varying between very little losses to almost complete packet loss. Communication between other locations is often subject to similar, or worse, network restrictions.

As previously mentioned, in order to have effective CON, a latency of less than 400 ms total is desired, with packet losses of less than 2%. Clearly, for CONs occurring between the US and China, these conditions are often not met. Thus, in addition to the established infrastructure already in place for the global internet, a control layer 130 is deployed across several central IDC 110 servers, and a transport layer 140 is distributed across tens of edge IDC 120 servers in order to effectuate transmission optimizations.

The transmission optimizations employed by the current system are twofold in order to address each possible source of packet degradation. First, just before a call is initiated, a last mile optimization is performed in order to select the best server for device connection and algorithm selection. Secondly, during a call over the network, a real time optimization may be employed to dynamically reroute transmission pathways based upon changing network conditions. These systems and methods will be described in more detail below.

Figure 2:
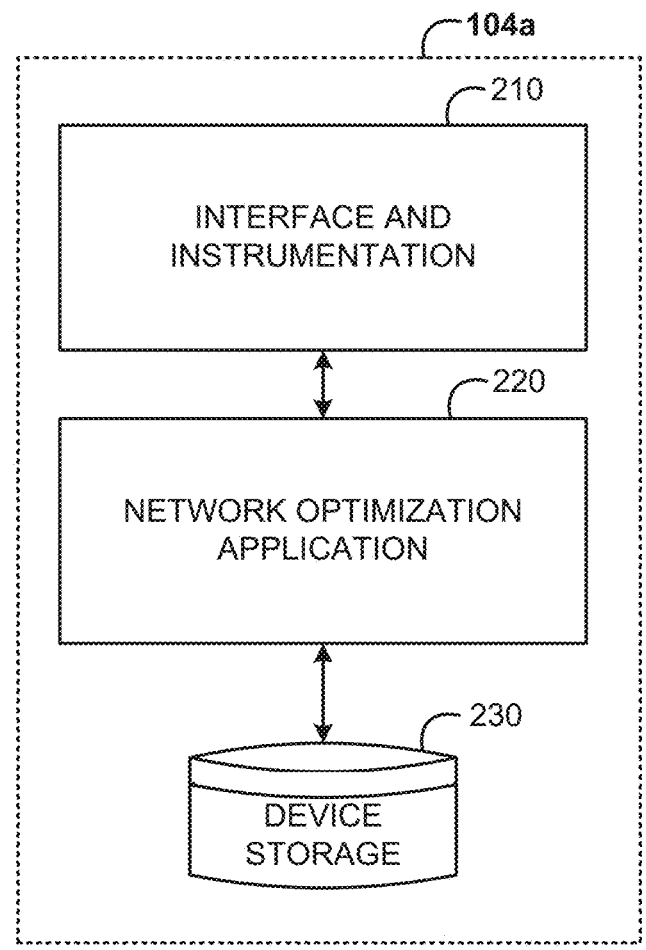
FIG. 2 is an example block diagram of a device utilized to engage in a call over network, in accordance with some embodiment.

Much of the call quality improvements provided herein requires interplay between the devices 104a-n and the associated software stored thereon, and the servers located in the control layer 130 and transport layer 140. FIG. 2 is an example schematic block diagram for one such communication device 104a used in conjunction with a call over network 100. In this illustration, the device is seen as including at least one interface and the instrumentation 210 required to effectuate the call. At a minimum this includes one or more displays, speaker, microphone, and input devices (touch screen, keyboard, etc.). The device 104a also requires a means to transmit data to and from the network 106. This may include a Wi-Fi connection, cellular connection, or other connection type as is appropriate for the present device 104a. In addition, it may be desirous to have additional functionality that required specialized instrumentation, such as GPS, vibration, biometric collectors, temperature sensors, etc.

The instrumentation and interface 210 couples, physically or logically, with a network optimization application 220 ("app"), which typically includes computer readable instructions on non-volatile device storage 230, and executed via one or more processors. In the instant example, the app 220 is responsible for communicating with the last mile optimizer (found in the transport layer 140), and an access controller (found in the controller layer 130). The app 220 receives information from the access controller regarding last-mile server, and engages the last mile optimizers to measure packet transmission quality.

Figure 3:
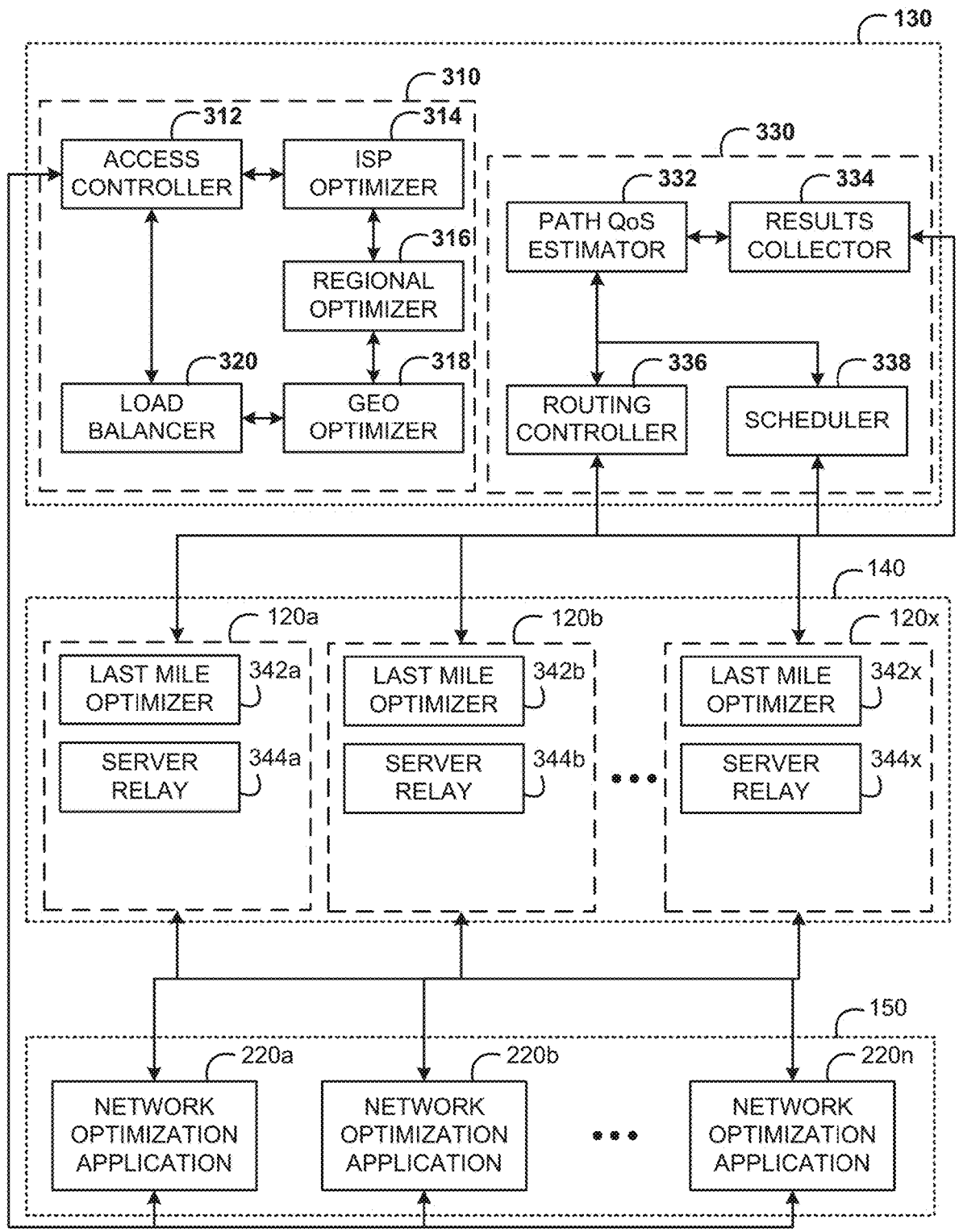
FIG. 3 is an expanded example block diagram of the system for improving real-time data packet delivery, in accordance with some embodiment.

FIG. 3 provides a more detailed illustration of the various components located within the controller layer 130, transport layer 140, and the application layer 150. As would be expected, a plurality of apps 220a-n exists within the application layer. The apps 220a-n correspond to their respective devices 104a-n.

Within the transport layer 140, there are tens of edge servers 120a-x. Each edge IDC 120a-x includes a last mile optimizer 342a-x, and a server relay 344a-x. The last mile optimizer 342a-x runs in the background before the initiation of a call. The apps 220a-n measure the quality of transmissions between various last mile optimizers 342a-x, a selected by the access controller 312. This selection of the 'several best' servers for testing by the access controller 312 is performed based upon the applications IP address and geographic location information by the general optimizer 310, in some embodiments. In alternate embodiments, the general optimizer 310 may determine the best servers based purely upon regional and geographic variables and not rely upon ISP similarities.

When ISP is utilized, however, the access controller 312 leverages an ISP optimizer 314 which can determine the internet service provider (ISP) based upon the user's IP address by querying an IP database. The optimizer then selects other servers within the same ISP. However, if a suitable ISP server is unavailable, the ISP optimizer 314 would instead return a best match for a server based upon historical data best matches for the given ISP. In alternate embodiments, rather than matching the ISP, the system may either entirely ignore IP addresses, or may merely rely upon historic data of ISP's with the best past service.

The access controller 312 also receives feedback from a regional optimizer 316 which returns a listing of servers located in the same region as the device 104 running the app 220. For example, in some embodiments there are multiple servers in Nanjing and Hangzhou with the ISP China Telecom. For a user from Wuxi, the regional optimizer 316 would recommend Nanjing before Hangzhou, because Wuxi and Nanjing are both in Jiangsu province. In a similar vein, the geo optimizer 318 identifies the closest server to the user (not merely those in the region) for consideration. Once the possible server candidates are identified, a load balancer 320 looks at the relative loads each server is currently subjected to in order to identify the most likely server to be best suited to handle the data traffic. The access controller 312 then communicates this short list of the 'several best' servers to the app 220 for testing.

While the disclosed embodiments suggest that first the ISP is matched, followed by regional identification and subsequently geographic proximity, it is possible for alternate embodiments to operate in different manners. For example, in some embodiments, the region may first be optimized for, and subsequently the ISP match and geographic optimization may be performed. Likewise, in another embodiment the geographic optimization may be performed without any ISP or regional optimization. Likewise, possibly the geographic optimization may be initially performed, and verified by a regional optimization and/or ISP match. Clearly, this optimization for finding the best servers may be completed in a large number of ways based upon available data, resources, and desired output.

The above testing (regardless of embodiment) is known as the individual optimization for the device, and includes measuring latency, jitter and packet loss via the transmission of pseudo-packets to the last mile optimizers 342 identified in the general optimization, and receiving feedback regarding the quality of packet transmission. In this manner the 'several best' servers may be narrowed to the 'single best' server for the given app 220. Lastly, as will be described in greater detail below, the app 220 may additionally compensate for any residual network deficiencies by employing various transmission algorithms, and measuring each one's efficacy to select which algorithms to actually utilize during the call. Examples of the transmission algorithms include employ retransmission algorithms, FEC, lower the encoder bitrate, etc.

During transmission, the device and servers may undergo negotiations to improve data transmission fidelity. For example, if a receiver detects a bandwidth downgrade, it can negotiate with the sender (feedback loop) and the sender may then re-optimize the encoder and/or re-packetize the data in order to use less bandwidth. For example, since there is significant header overhead, larger packets may be more efficient for transmitting data in a constrained bandwidth situation (assuming packet loss is below an acceptable threshold). The system may thus continually negotiate and modulate the packet size and encoding based upon real-time network conditions.

The server relays 344a-x may identify issues during a call and immediately shift data traffic to backup pathways. As noted above, for any given device a listing of several best servers have already been determined. These several best servers may be continually tested in the background to maintain a short list of the very best servers for the device. In the event of a failure or unacceptable degradation in communication with the selected server, maintaining this list of backup servers allows for very rapid switching to a secondary server.

Information from the test programs found in the application layer 150 and the agents of the transporter layer 140 may be provided to a monitor (not illustrated) within the controller layer 130. The monitor may trigger alarms if there are failures in the system, and may also provide status updates and load information to the access controller 312 for its determination of the 'several best' servers to employ during the general optimization.

Figure 4:
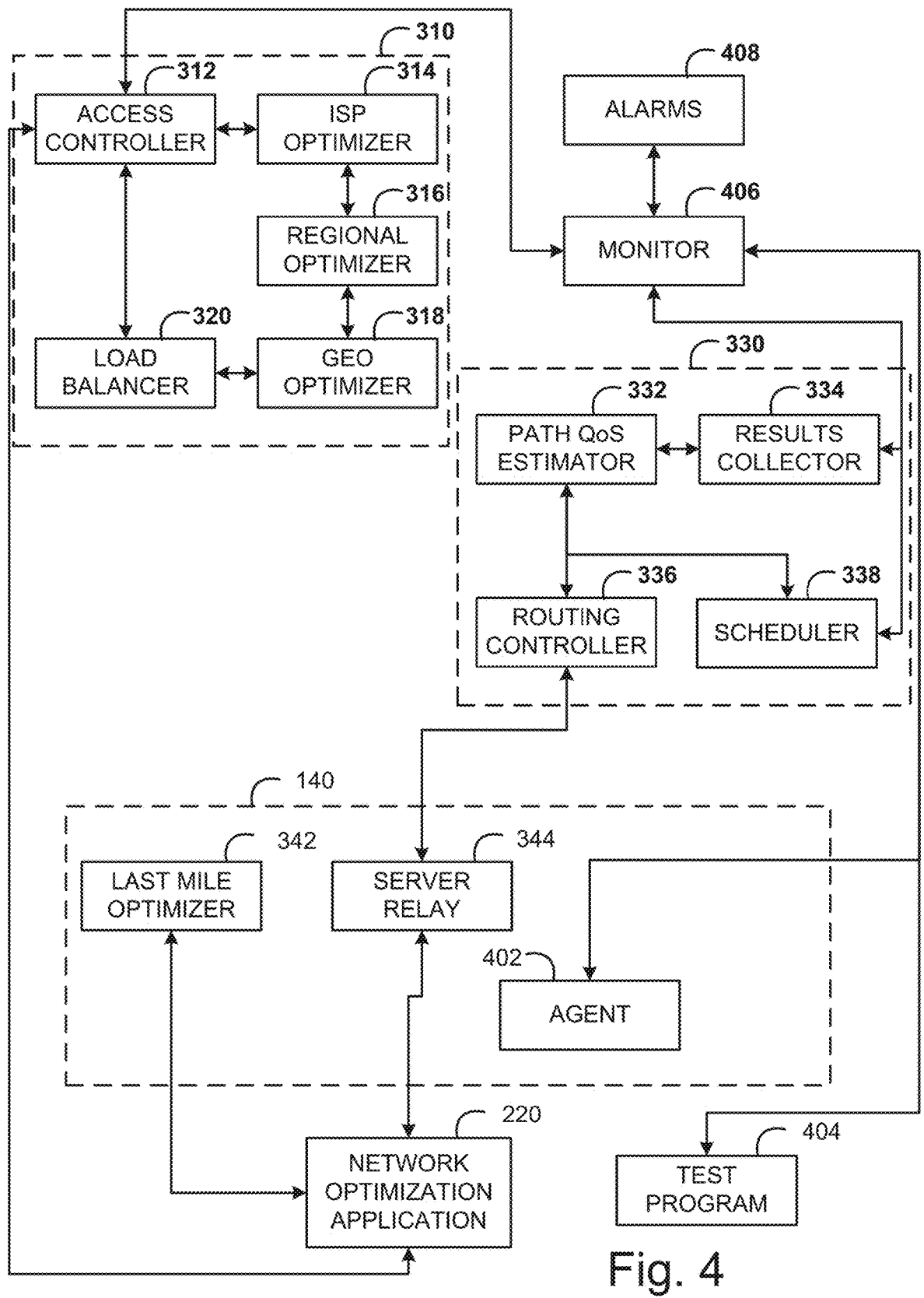
FIG. 4 is an example block diagram of the system for improving real-time data packet delivery with specific data paths identified, in accordance with some embodiment.

Continuing to FIG. 4, the same system architecture is illustrated with a reduction in the redundant components. The purpose of this Figure is to more clearly illustrate the interconnectivity of the various components within the system architecture. Again, the network optimization app 220 is seen coupling to the access controller 312 in order to request the 'several best' servers which to test. These several best servers are determined by IP address and geographic location, as previously discussed, by the ISP optimizer 314, regional optimizer 316, geo optimizer 318 and the load balancer 320. Some of the information used to compute the general optimization, such as ISP lookup tables may be compiled over the course of time. Other data, such as system status and load levels may be collected from the monitor 406. The app 220 then interacts with the last mile optimizer 342 to test the 'several best' servers via packet exchange in order to narrow done to one or two 'best' server(s). If a best server is unable to be identified, a number of servers may be simultaneously utilized to try to ensure high packet transmission fidelity.

Lastly, once the best server is selected via the individual optimization, the application 220 and server relay 344 work to determine suitable transporter algorithms to employ during transmission, as previously discussed. This is known as the wireless optimization, and may include the testing of algorithms for retransmission on lost, FEC, simultaneous path, very low bitrate encoding, sending of multiple voice frames in one packet, adaptive jitter buffer, PLC, etc.

Collectively, the general, individual and wireless optimizations constitute the last mile optimization for the packet transmission. These optimizations may be employed just before a call initiation.

In some embodiments, the pseudo-packets sent for backbone optimization may be similar to voice data transmissions, which are approximately 40 bytes each, and sent every 20 ms smoothly with a consecutive sequence number i(1, 2, 3 . . . ). When the backbone optimizer 346 receives the pseudo packets I, it saves the packets receipt time ts(i) in milliseconds. Packet loss is simply determined by determining total packets received in a given time period versus expected packets. For example, given a 20 ms transmission rate in the above example, in a two second period, exactly 100 packets should be received. Thus loss rate is calculated as:

$$loss = \frac{100 - receivedPacketCount}{100}$$ Equation 1: packet loss calculation Similarly, jitter may be calculated utilizing the packet receipt timing and the sequence number with the following: for i=1, 2, . . . , 100

$j(i)=ts(i)-i*20$ $j_{min}=\min(j)$ for i=1, 2, . . . , 100

$J(i)=j(i)-j_{min}$

Sort($j$)

jitter100=$j$(100)

jitter95=$j$(95)

jitter90=$j$(90)  Equation 2: jitter calculation

An agent 402 and test programs 404 collect information on the operation of the last mile optimizer 342 and edge servers. Data collected from the agent 402 and test programs 404 is provided to the monitor 406 in the controller layer 130. Major issues with the system may prompt one or more alarms 408 to be activated. Alarms 408 may vary depending upon the extent of the failure, and may include email and SMS notifications to engineers to resolve the issue. Additionally load conditions of servers and status of the optimizers is provided to the access controller 312 as noted above.

A large amount of statistical data is collected from the systems operation, and these statistics may be mined to generate suitable reports, including real-time reports about the quality of service of recent calls, as well as aggregate reports on a daily, weekly, and/or monthly basis. When the system encounters failures, it is also possible to diagnose the problem based upon the collected statistical data. Diagnostic, statistical collection, and reporting may all occur at the controller layer at a central IDC.

Lastly, as previously noted, as the call is actually occurring, the network fidelity is monitored by the edge servers, and if there is a pathway failure, the data may be re-routed over backup pathways.

Lastly, in certain circumstances it may be desirable to be able to manually control the route pathway, employ specific algorithms, or dynamically configure any component of the presently disclosed transmission optimization system.

Now that the architecture employed for the improvement of communication data transmission has been described in considerable detail, attention shall be redirected toward the processes employed to facilitate the efficiencies in the care.

II. Methods for Improving Communication Packet Transmission Quality

The following figures and descriptions are but some exemplary embodiments for the methods of improving communication data transmission. It should be realized that permutations and substitutions of the disclosed methods in order to improve performance of the transmissions is considered within the scope of this disclosure.

Figure 5:
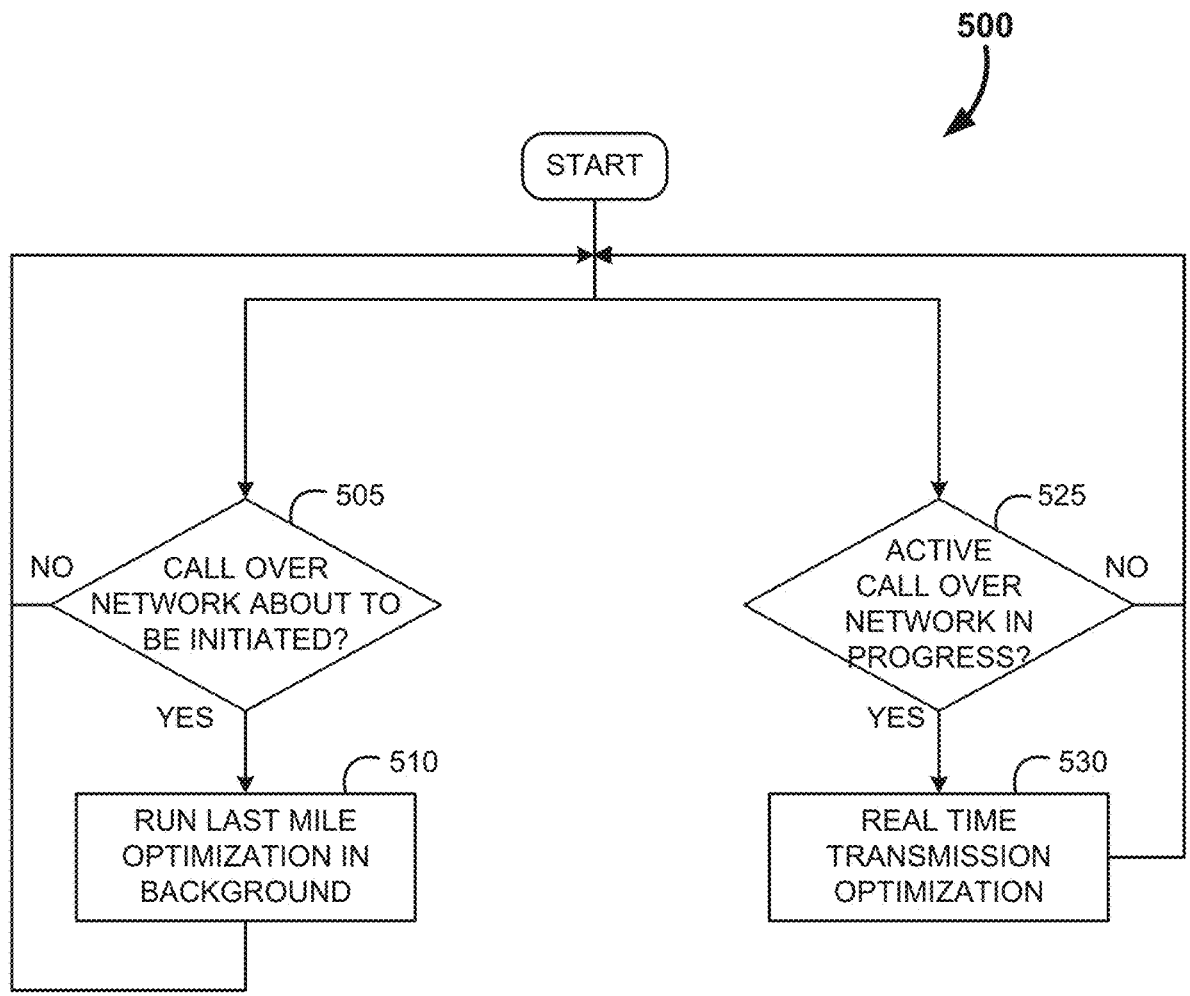
FIG. 5 is an example flow diagram for the process of improving real-time data packet delivery, in accordance with some embodiment.

FIG. 5 is an example flow diagram for the general process of improving of communication data transmission, shown generally at 500. As previously noted, this process has two main components. The last mile optimization (at 510) that is only executed right before a call over the network is to be initiated (at 505). The second optimization is employed only when the user is actively engaged in a call over the network (at 525) and includes the real time transmission optimization (at 530). These optimizations operate in concert with one another to provide the best call over network possible given an imperfect Internet infrastructure. However, while these individual optimizations are particularly beneficial when operating in concert, they are also independent from one another, and each may be employed with or without the others based upon system needs and capabilities.

Figure 6:
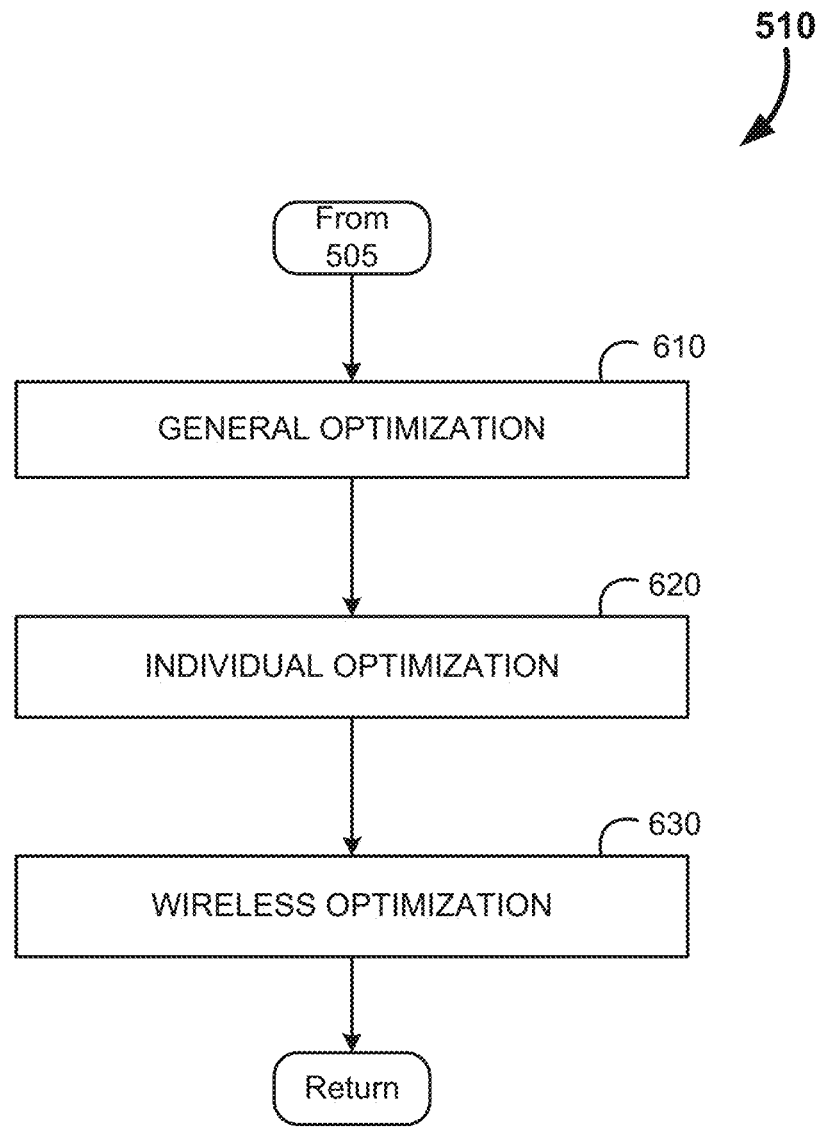
FIG. 6 is an example flow diagram for the sub-process of last mile transmission optimization, in accordance with some embodiment.
Figure 7:
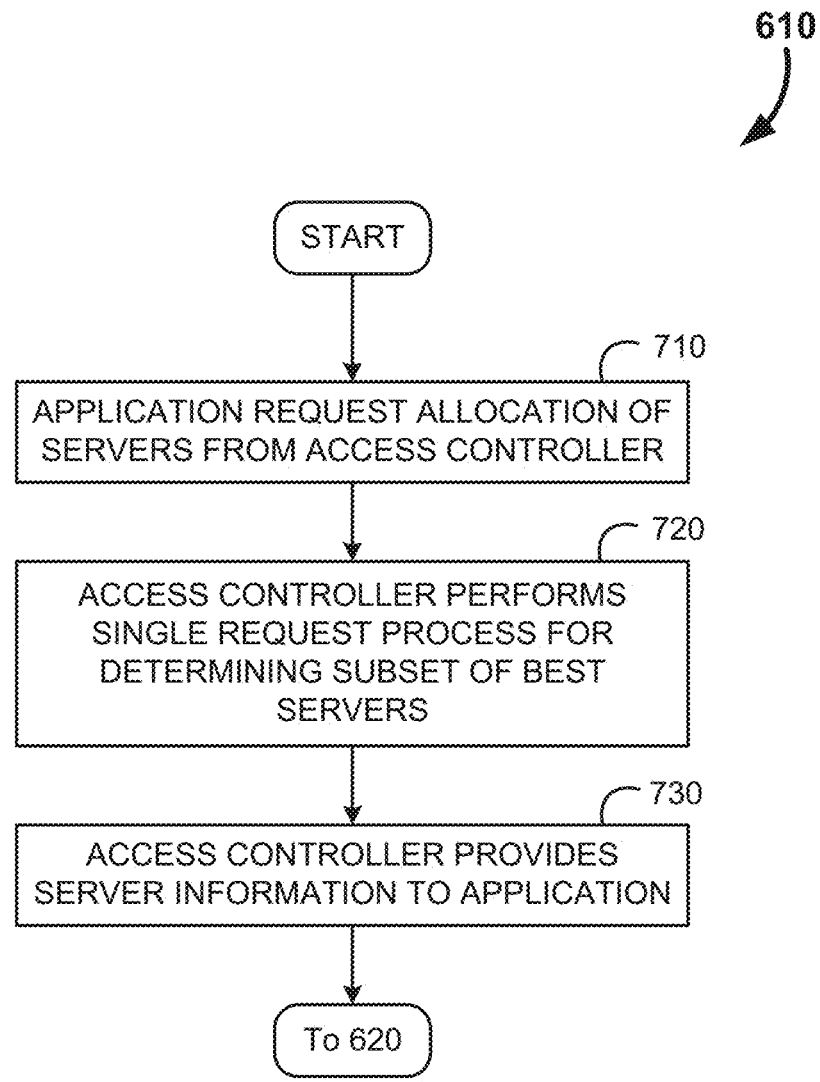
FIG. 7 is an example flow diagram for the sub-process of the general optimization for the last mile transmission optimization, in accordance with some embodiment.

The last mile optimization (510) is described in greater detail in reference to FIG. 6, where it is broken down into three discrete optimizations: a general optimization (at 610), and individual optimization (at 620) and the wireless optimization (at 630). The general optimization (610), provided in reference to FIG. 7, includes the application requesting allocation of servers from the access controller (at 710). The access controller performs a single request process for the determination of the best servers (at 720) by looking up the ISP gained from the user's IP address from a lookup of an IP database, and then returning the servers with the same ISP. Servers may also be narrowed by their regional location and relative load. The access controller is then able to provide the server information for these 'several best' servers to the application (at 730). As previously noted, in some embodiments the ISP matching may be avoided altogether. Likewise the optimization for the several best servers may be done in a different order: regional optimization, ISP match and geographic optimization, for example. Of course all other optimization ordering permutations are likewise possible in some embodiments.

Figure 8:
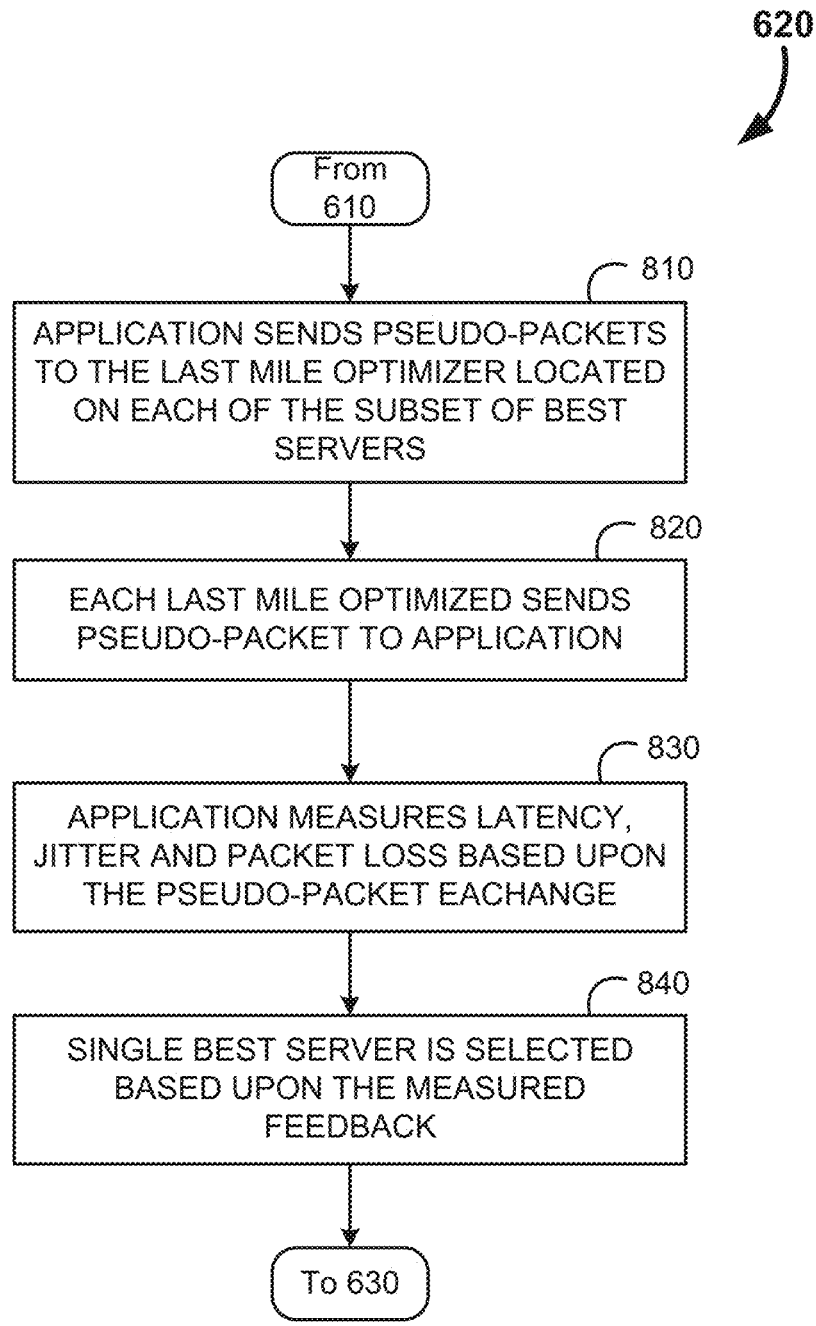
FIG. 8 is an example flow diagram for the sub-process of the individual optimization for the last mile transmission optimization, in accordance with some embodiment.

The individual optimization (620), provided in reference to FIG. 8, leverages these 'several best' servers in order to actually test them to determine the single best server to use. This is done by the application sending pseudo-packets to the last mile optimizer located on each of these 'several best' servers (at 810). The last mile optimizer in response may send back pseudo-packets of data to the application (at 820), or may simply generate feedback for the packets received. The application measures the latency, jitter and packet loss based upon the packet exchange (at 830). These factors are balanced to evaluate voice quality, and the single best server is selected (at 840) based upon the server that will deliver the best voice quality.

Figure 9:
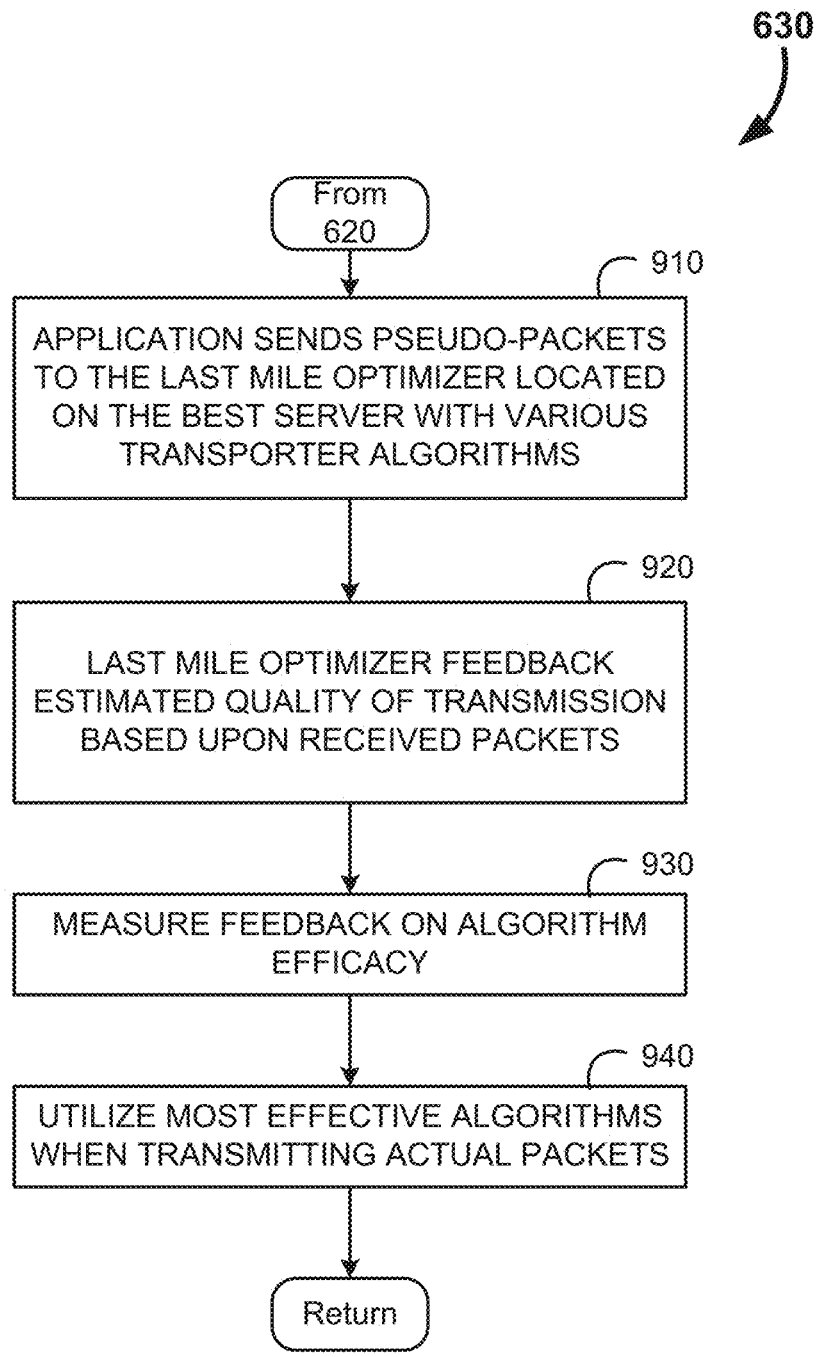
FIG. 9 is an example flow diagram for the sub-process of the wireless optimization for the last mile transmission optimization, in accordance with some embodiment.

Even after the best server has been identified, the process still undergoes wireless optimization (630), provided in reference to FIG. 9, in order to squeeze the very best possible quality out of an imperfect network infrastructure. As previously noted, there are a wide variety of transporter algorithms available to attempt to increase transmission quality. Examples include, for example, modulating jitter buffers, lower bitrate transmission, multiple pathway utilization, etc. It is not always feasible or desirable to utilize each of these transporter algorithms, however. For example, if the pathway employed is clearly superior to all other pathways, employing multiple simultaneous pathway transmissions would not provide any benefit to the transmission quality, and would only increase transmission volumes and processing power. Thus, in such a situation this transporter algorithm wouldn't be desirable. However, a lower bitrate with retransmission may be desired for a pathway with problems with packet loss but low jitter.

Thus, for this wireless optimization (630) the application sends pseudo-packets to the last mile optimizer located on the identified best server with a variety of these transporter algorithms employed (at 910). The last mile optimizer feeds back estimations of the quality of service of a given transmission based upon the received packets (at 920). The feedback is used to measure algorithm efficacy (at 930), and the best algorithms may be selected for usage once the actual call is being conducted (at 940). Thus, for any given network condition, only the best transported algorithms are employed.

The selection of the best transporter algorithms for a server that has been tested to be the best from a subset of candidate servers is the final result of the last mile optimization. At this stage a call may be initialized using the identified server and the identified algorithm, thereby ensuring that the transmission quality between the final edge server and the user's device is as optimal as possible.

Figure 10:
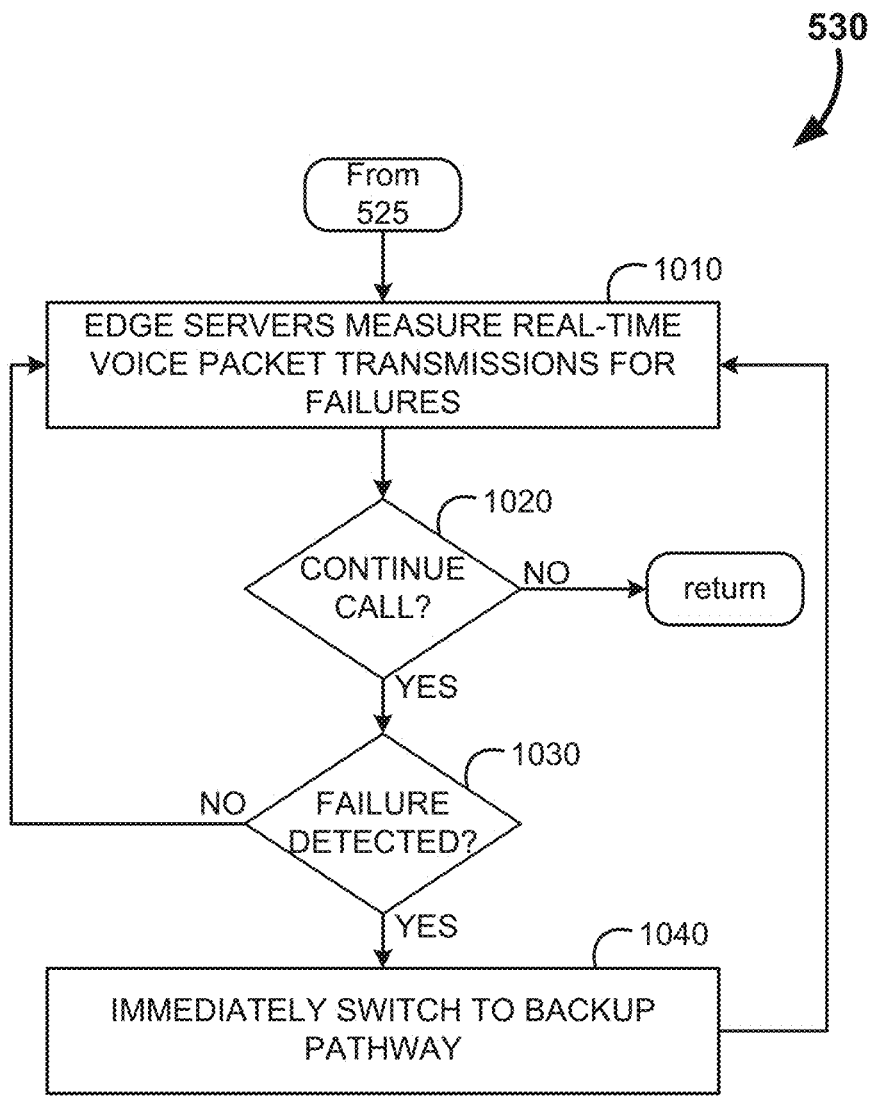
FIG. 10 is an example flow diagram for the sub-process of real-time transmission optimization, in accordance with some embodiment.

Moving on to FIG. 10, further details are provided regarding the real time optimization of an ongoing call, shown generally at 530. As previously noted, although backbone optimization is capable of identifying the best pathway for transmission, the nature of the internet is dynamic, and the conditions of any given pathway may deteriorate based upon loads, equipment malfunctions, damage, or a variety of other causes. When such a change occurs that causes a failure of the pathway being employed for a given call, the real time monitoring of the call quality can re-route the transmission pathways in order to rapidly react to the changing network conditions. Initially the edge servers measure the communication packets in real time for failures (at 1010). At any time the call may be discontinued (at 1020) which ends the process. If a failure is detected (at 1030) then the process immediately switches to one or more backup pathways (at 1040). The process than waits for a new 'best pathway' to be identified by the backbone optimization process, and upon identification of the better pathway may shift the communication packet transmissions to the newly identified pathway (at 1050). The process then returns to monitoring the communications for any failures.

Additionally, as noted previously, the receiver continually measures network conditions even after the transmissions have been initiated. Upon detecting any issues with the network, such as a bandwidth restriction, the receiver may negotiate with the sender to alter the transporter algorithms in order to improve transmission quality.

III. Example

Figure 11:
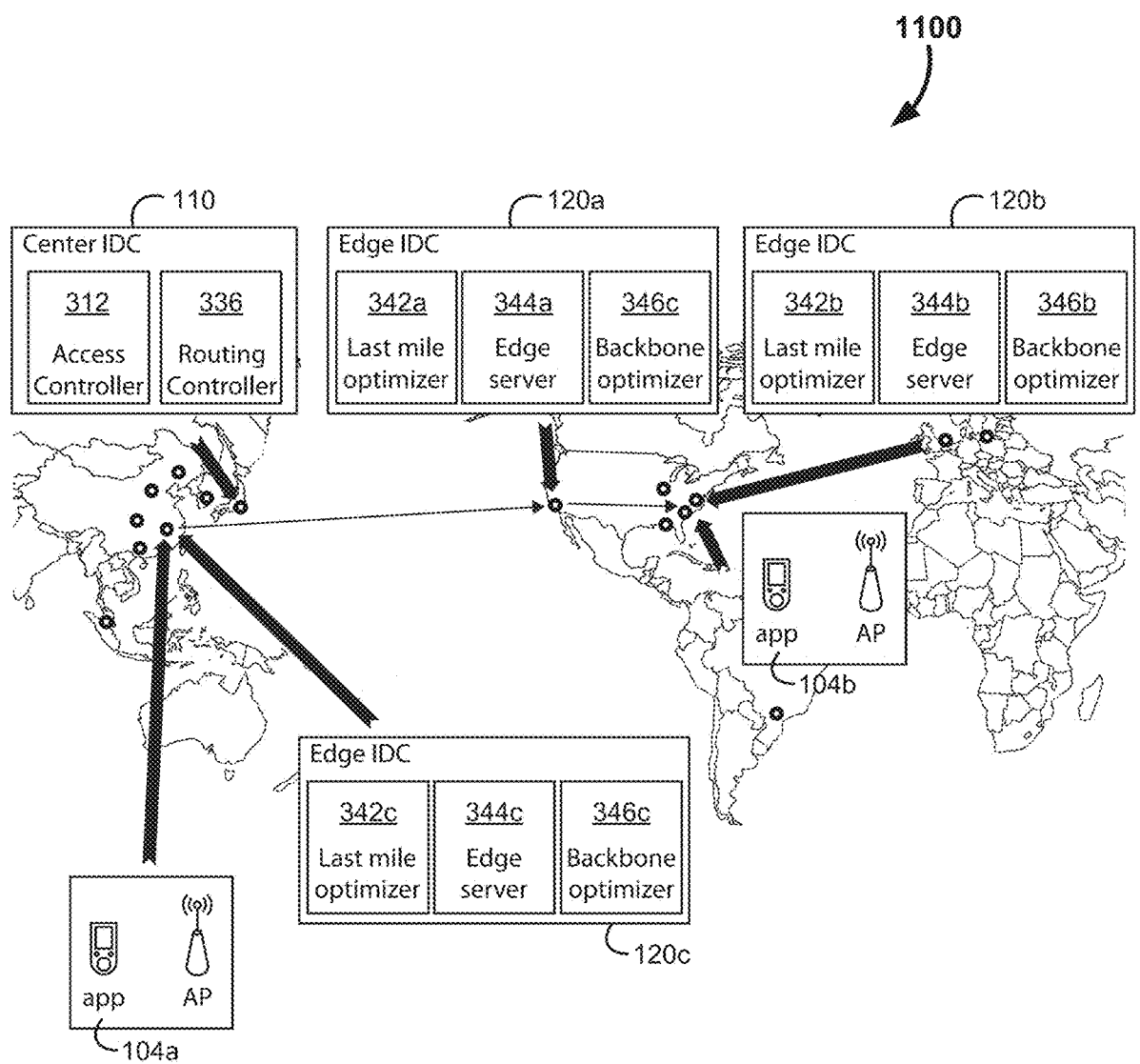
FIG. 11 is an illustration of an example geographic distribution of system components for a trans-pacific call utilizing embodiments of the system for improving communication packet delivery.
Figure 12:
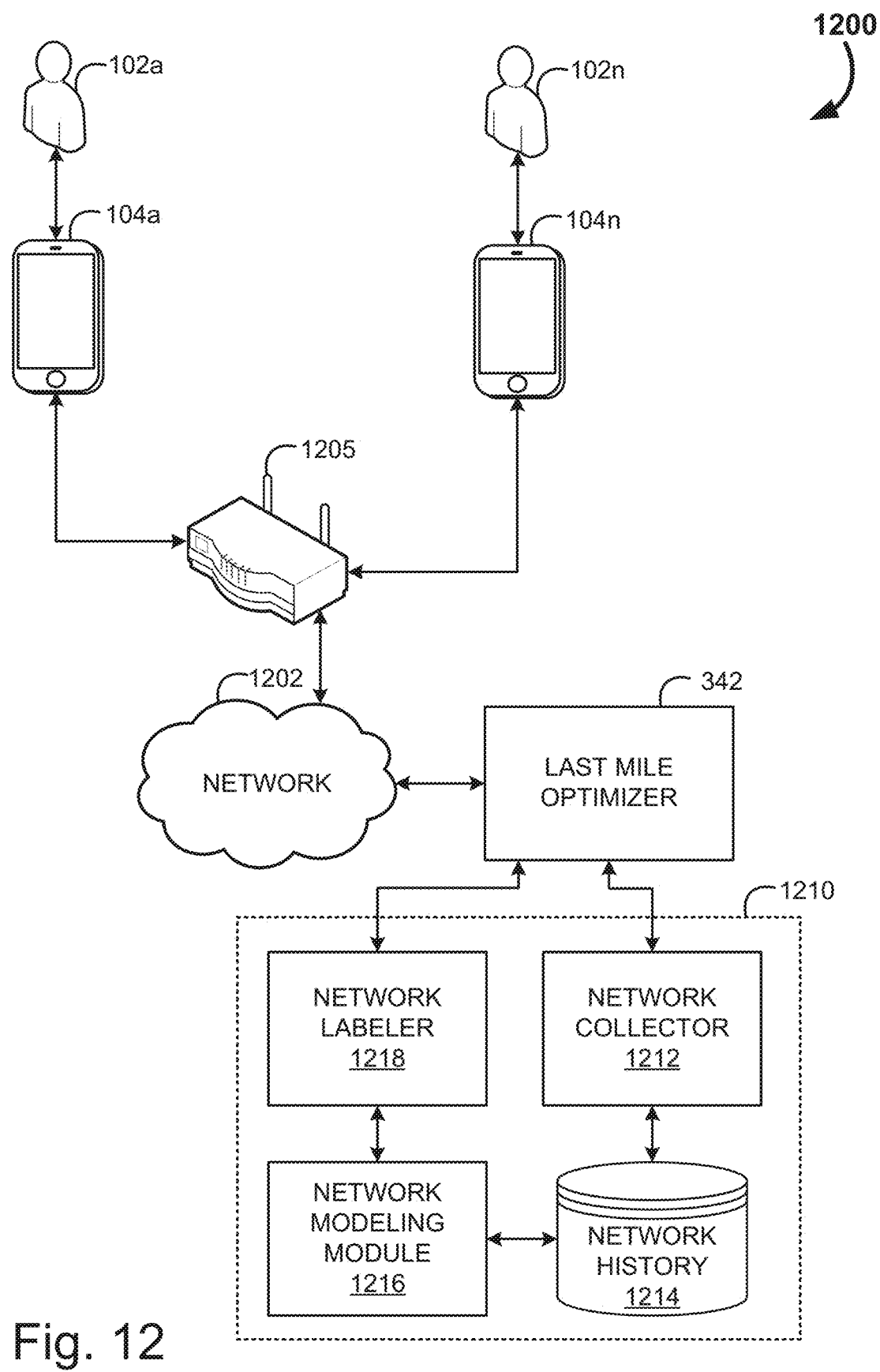
FIG. 12 is an example block diagram of a system for improving real-time data packet delivery through network labeling, in accordance with some embodiment.

Now that the systems and methods for the optimization of communication packet transmission has been described in considerable detail, attention will be turned to various examples of embodiments of the system being employed. To facilitate this discussion, FIG. 11 is an example screenshot for the geographic distribution of the various system components, shown generally at 1100. It should be noted that this example illustration is provided by way of example only, and is intended to clarify without unduly limiting the scope of the disclosure.

Various servers are deployed, in this example, across the planet. Some of the servers are central IDCs 110, but the majority of the servers deployed are edge IDCs 120. The edge IDCs 120 include the last mile optimizer 342 and the edge server/server relay 344. Also as previously discussed, the edge IDCs 120 may include an agent for testing components for failures. The central IDC 110 illustrated also includes the access controller 312 and the routing controller 336.

A device 104*a* may access the internet via an access point, as described previously. In this example, a user in Hangzhou, China would like to talk to another user in New York. The app within the device 104*a* gets some edge servers in Shanghai, Guangzhou, Wuxi, etc. from access controller 312 via the aforementioned general optimization. The app then tests these several servers for the very best ones, and determines which algorithms to employ. This concludes the last mile optimization process. Then, the app sends the best edge server (in the present example the Shanghai edge server 344*c*) voice packets. The Shanghai edge server 344*c* then routes the packets to an edge server in California and then one in Virginia. From the final Virginia edge server, the packets are then provided to the recipient application on the recipient device 104*b*.

IV. Systems for Network Labeling

In contrast to the above described systems and methods for improving real time data transfers via network backbone optimizations, there is often a significant source of network degradation that occurs at the terminal ends of the network. This includes faulty router equipment, badly placed wireless access points, overloaded network components such as modems and switches, signal pollution, and usage spikes that limit data throughput. Many of these issues are location and time dependent, and often consistently plague particular networks in particular ways.

Figure 13:
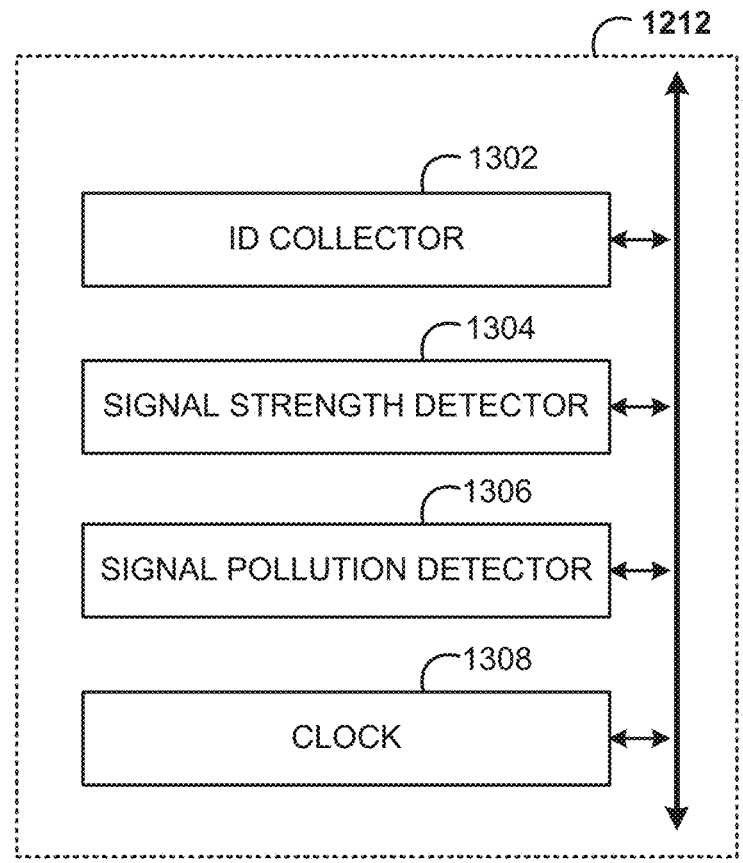
FIG. 13 is an example block diagram of a network data collector, in accordance with some embodiment.

In order to address these network terminal problems, systems for network labeling are disclosed. To facilitate this discussion of network labeling, FIG. 13 provides another example block diagram 1200 of a network environment. As previously discussed there exists in this network users 120a-n, and their associated devices 104a-n. What has not been previously illustrated is that these devices are coupling to an endpoint 1205 of some sort prior to gaining access to the network 1202. The endpoint 1205 may be any wireless access point, router, modem, or may include a cell tower or alternate bridge between the device 104 and the internet (or other suitable network 1202). The system for network labeling often works in conjunction with the aforementioned last mile optimization system 342 in order to provide true end-to-end improvement of the data transfer.

The entire system works in conjunction with a network label system 1210 in order to compile information regarding the endpoint 1205, model router/tower/modem performance, and provide feedback on which access point/endpoint to leverage. The network label system 1210 includes a number of subcomponents: a network information collector 1212 pulls temporal, identification and quality metrics from initiated real-time data transfers; a network history database 1214 saves this collected information and operates in conjunction with a network modeling module 1216 to generate and store predictions of network, and particular router 1205 performance; lastly a network labeler 1218 provides back information regarding network performance in order to optimize device 104 connectivity to any given endpoint 1205.

It has been observed that any given network has connectivity patterns. For example, a large office may have poor performance during peak work hours, but may perform very well outside of standard business hours. Conversely, a particular residential neighborhood services by a single broadband cable may suffer from bandwidth limitations after business hours. Lastly, a hotel or apartment may deploy a 2.4G router within every room, resulting in significant wireless pollution that renders real-time data transfers inoperable at any time.

The network information collector 1212 may collect a series of metrics on a given network whenever a connection is established. FIG. 13 provides additional details of the network information collector 1212, which includes subcomponents for collecting identification 1302 of the endpoints 1205, signal strength detection 1304, ambient signal pollution measurements 1306, GEO/Location of the device, and a clock 1308 for collecting timing information. The ID collector 1302 may collect LAN or router MAC addresses, router BSSID and any other identifying information for the network. The signal strength of the endpoint being connected to is monitored, as well as competing signals (wireless pollution). All this collected information is cross referenced by the time of data collection which is critical for determining patterns in the network quality.

In some embodiments, router BSSID, MAC addresses and all other identifying information may be hashed in order to protect user privacy.

As previously touched upon, some networks are wholly undesirable for real-time data transfers, but other often experience very predictable fluctuations in quality. Once sufficient data has been collected for each network, a predictive model for the network quality is able to be generated. Thus, when a device attempts to initiate a real time data transfer via a given network, the network labeler is able to predict the suitability of the network, and even provide suggestions for better communications. These suggestions may include a suggestion of waiting a certain length of time before initiating the data transmission (to a time when the network performance is predicted to be better), choosing a nearby alternate endpoint for connection, or switching to another network entirely (e.g., 3g/4g or PSTN line as opposed to WiFi).

V. Network Labeling Processes

Figure 14:
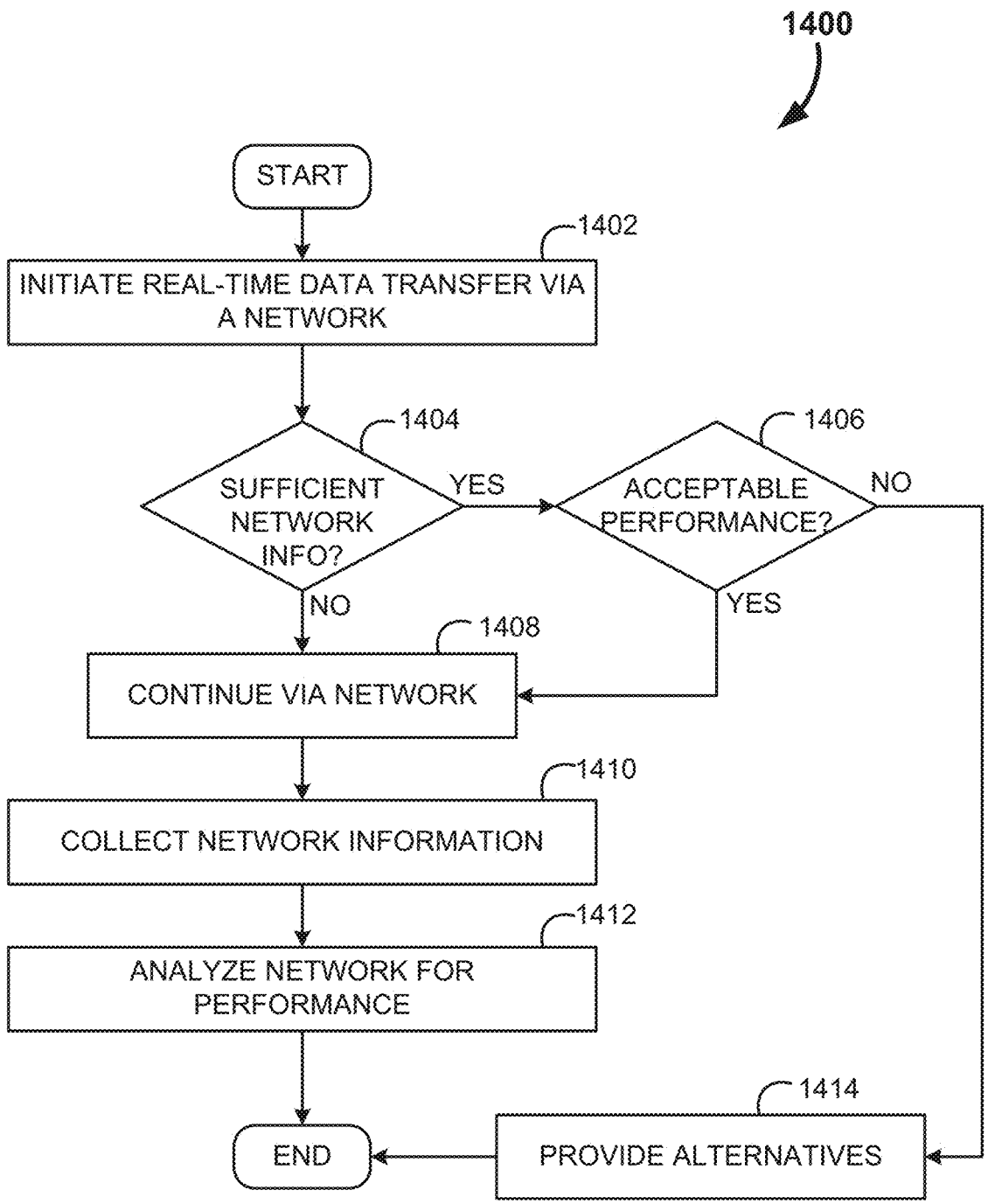
FIG. 14 is a flow diagram for an example process of network labeling for enhancing real time data transfers, in accordance with some embodiment.
Figure 15:
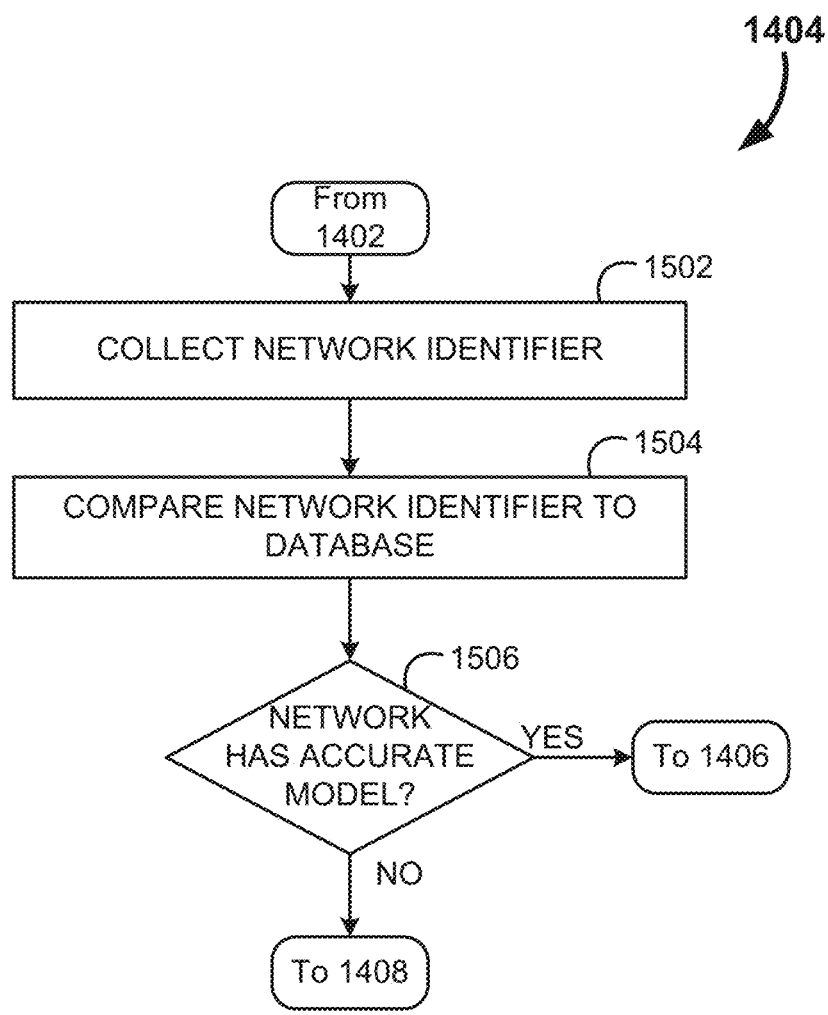
FIG. 15 is a flow diagram for an example process of determining if sufficient network information has been collected, in accordance with some embodiment.
Figure 16:
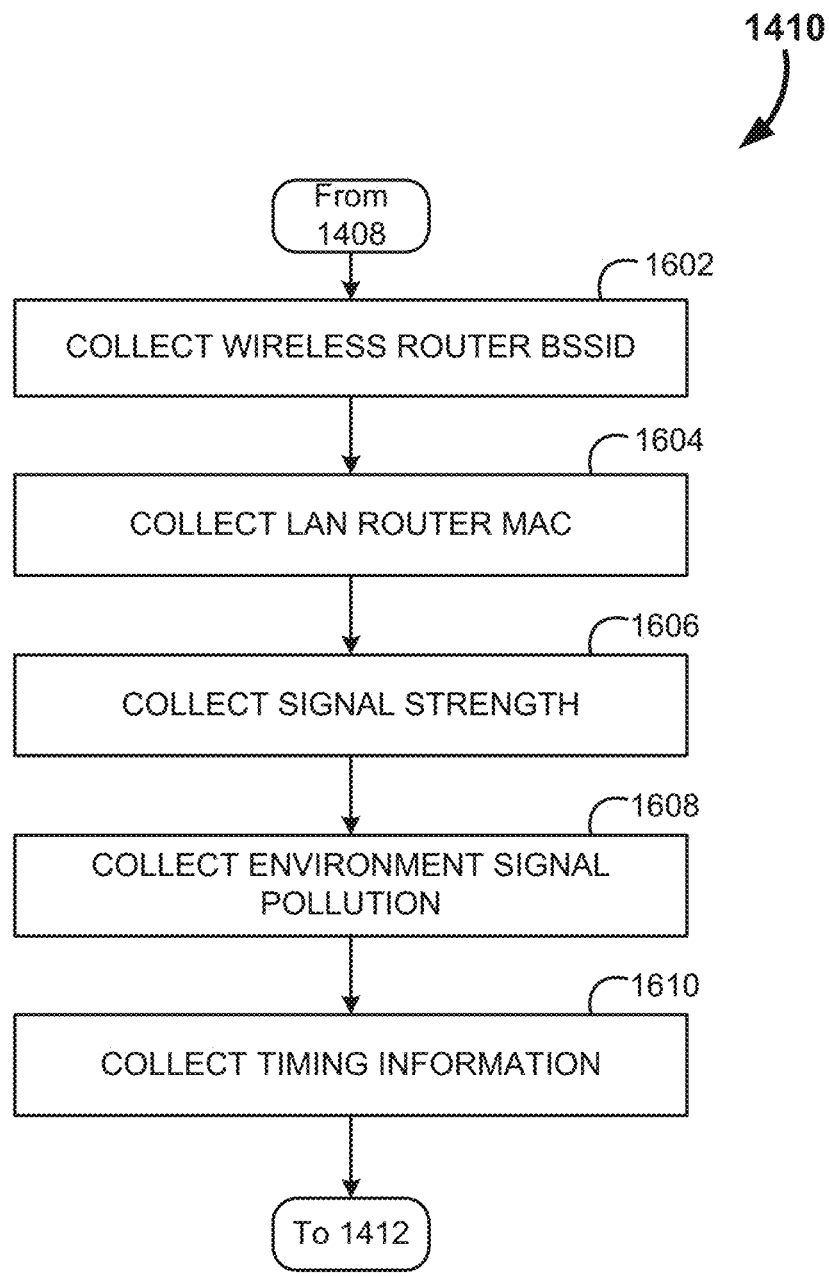
FIG. 16 is a flow diagram for an example process of collection of network data, in accordance with some embodiment.

FIGS. 14-16 delve into the processes of network labeling in greater detail. Starting with FIG. 14, the example process 1400 begins with the initiation of a real-time data transfer via a given network and endpoint (at 1402). Immediately the network label system gathers identifying information for the network, and makes a determination if sufficient data has previously been collected for the network in order to make a decision on whether the network should be utilized or alternates suggested (at 1404).

FIG. 15 provides greater detail regarding this determination. As noted, the network identifiers are initially collected (at 1502) in order to compare against the information previously collected. The network IDs may include BSSID, MAC addresses, or other suitable identification information. All ID info may be obscured via a hash or alternate means in order to maintain user privacy.

This ID information is then compared to network data already stored within the database (at 1504). This includes comparing against measured network performance information, as well as predictions for network performance that have been modeled. Modeled network performance may include statistical measures, such as accuracy computations, in order to assist in vetting whether sufficient data is available. Multiple things may impact model accuracy: for example, too little data may make it difficult to model a given network's performance. Likewise, networks with very complex usage patterns, or that include randomness in their performance may be likewise difficult to accurately model, regardless of the level of data collected. Entire technological fields have been developed for the purpose of generating predictive models, and for determining the accuracy of a given model for a dataset. As such, for the sake of clarity, details of the model generation and accuracy determination are intentionally omitted from this disclosure as those skilled in the art are fully capable of enabling such statistical methods.

Upon comparison of the network identifying information to the performance model, a determination is made whether the models generated are accurate enough to make a determination regarding network suitability (at 1506).

Returning to FIG. 14, if there is simply not enough information for a given network, the system may opt to continue with the data transfer (at 1408) with the assumption that the network is 'good enough' to function. Alternatively, if there is already sufficient information for the network (robust enough models) then the next step may include a determination if the performance of the network is acceptable (at 1406). Again, if performance of the network is acceptable, then the call can continue via the network uninterrupted (at 1408).

However, if the network is not suitable, the system may instead provide alternative suggestions (at 1414) in order to ensure better overall data transfer performance. As previously indicated, the timing of a call may be delayed if the performance issue is transient, or other access points or networks may likewise be suggested for more enduring network performance deficiencies.

Regardless of network chosen for the data transfer, additional network data is continually collected (at 1410) in order to improve the predictive model for the network's performance. FIG. 16 provides additional details of this data collection process. This example data collection process includes collecting router BSSID (at 1602), equipment MAC information (at 1604), and hashing all identifying information. Next the signal strength for the network is collected (at 1606), as well as ambient signal pollution (at 1608), GEO/Location of the device. Lastly timing information is collected (at 1610) in order to enable the ability to identify patterns in the network's performance.

Returning to FIG. 14, once the data is collected it may be further analyzed in order to generate performance models for the network, or otherwise refine existing performance models with additional data (at 1412). Typically the data undergoes a cleaning in order to eliminate bad data and significant outlying signals. Then the data may be fitted to a predictive model using adaptive predictive algorithms, figure of merit functions, or other suitable predictive models. Likewise, statistical measures of accuracy of these models are generated, or updated, and stored for subsequent calls.

VI. System Embodiments

Figure 17A:
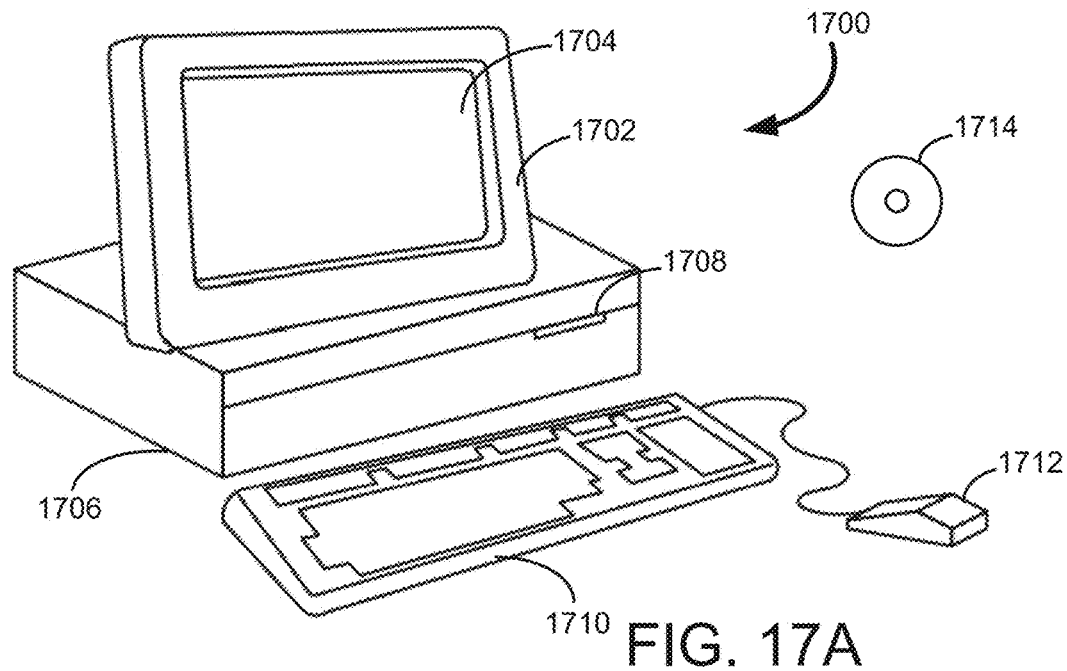
FIGS. 17A and 17B are example computer systems capable of implementing the system for improving real time data packet delivery, in accordance with some embodiments.
Figure 17B:
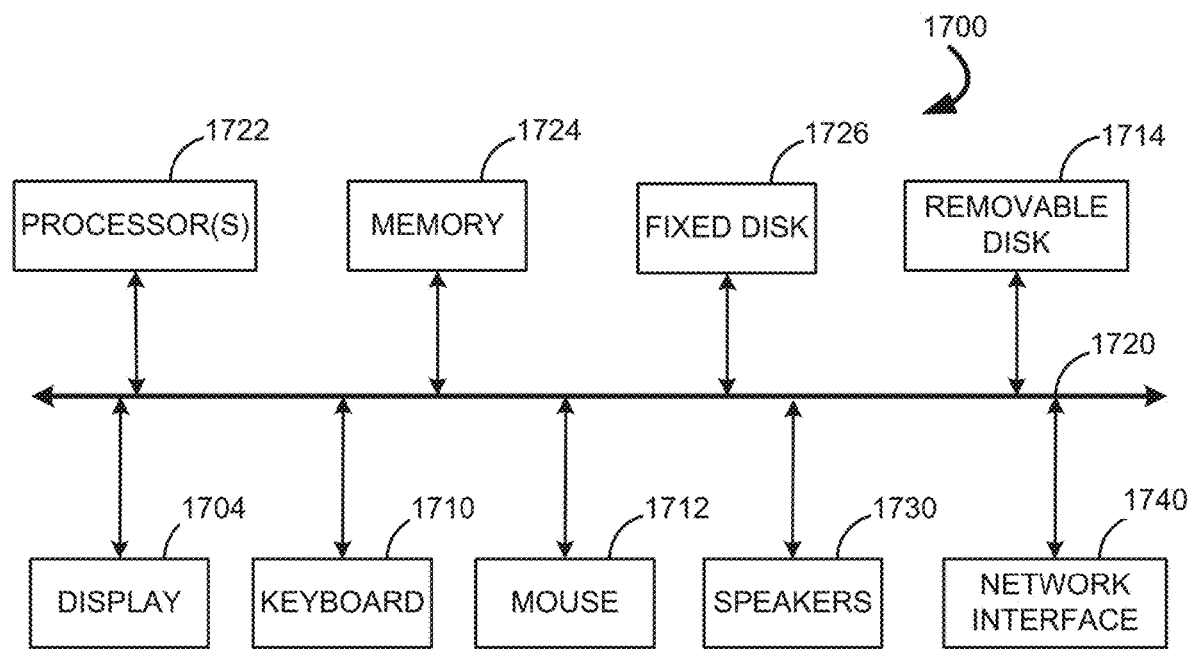

Lastly, FIGS. 17A and 17B illustrate a Computer System 1700, which is suitable for implementing embodiments of the present invention. FIG. 17A shows one possible physical form of the Computer System 1700. Of course, the Computer System 1700 may have many physical forms ranging from a printed circuit board, an integrated circuit, and a small handheld device up to a huge super computer. Computer system 1700 may include a Monitor 1702, a Display 1704, a Housing 1706, a Disk Drive 1708, a Keyboard 1710, and a Mouse 1712. Disk 1714 is a computer-readable medium used to transfer data to and from Computer System 1700.

FIG. 17B is an example of a block diagram for Computer System 1700. Attached to System Bus 1720 are a wide variety of subsystems. Processor(s) 1722 (also referred to as central processing units, or CPUs) are coupled to storage devices, including Memory 1724. Memory 1724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1726 may also be coupled bi-directionally to the Processor 1722; it provides additional data storage capacity and may also include any of the computer-readable media described below. Fixed Disk 1726 may be used to store programs, data, and the like and is typically a secondary storage medium (such as a hard disk) that is slower than primary storage. It will be appreciated that the information retained within Fixed Disk 1726 may, in appropriate cases, be incorporated in standard fashion as virtual memory in Memory 1724. Removable Disk 1714 may take the form of any of the computer-readable media described below.

Processor 1722 is also coupled to a variety of input/output devices, such as Display 1704, Keyboard 1710, Mouse 1712 and Speakers 1730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1722 optionally may be coupled to another computer or telecommunications network using Network Interface 1740. With such a Network Interface 1740, it is contemplated that the Processor 1722 might receive information from the network, or might output information to the network in the course of performing the above-described network labeling for the purpose of improving real time data transfers. Furthermore, method embodiments of the present invention may execute solely upon Processor 1722 or may execute over a network such as the Internet in conjunction with a remote CPU that shares a portion of the processing.

In sum, the present invention provides systems and methods for the improved transmission of communication packets utilizing network labeling. The advantages of such systems include the ability to improve voice and/or video communications over an imperfect internet infrastructure, especially over large distances (such as transcontinental communications), and where the terminal ends of the network are sub-optimal.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer-implemented method for improving real time packet delivery over a network in order to improve the quality of a call over said network, said method comprising:
   (1) by an access controller of a general optimizer, receiving, from a server selection optimizer of said general optimizer, a list of servers within a set of edge server, wherein said general optimizer is adapted to be deployed across a set of internet data center servers, said general optimizer includes said access controller, said server selection optimizer, and a load balancer, and said general optimizer is in a control layer;
   (2) by said load balancer, selecting a list of several best servers from said list of servers based on relative loads of each server within said list of servers;
   (3) by said access controller, sending said list of several best servers to a network optimization application running on a first communication device, wherein said network optimization application is adapted to be executed by a processor on a plurality of communication devices, said plurality of communication devices includes said first communication device, each communication device within said plurality of communication devices includes an interface and instrumentation, said network optimization application is physically or logically coupled to said interface and instrumentation, said interface and instrumentation includes a display, a speaker, a microphone, an input device and a network connection interface for accessing said network, and said network optimization application corresponds to an IP address;
   (4) by said network optimization application running on said first communication device, interacting, via packet exchange, with a last mile optimizer running on each edge server within said list of several best servers to select a best server from said list of several best servers for a call over said network between said first communication device and another communication device, wherein each edge server within said set of edge servers is adapted to transmit data over said network and said last mile optimizer is in a transport layer; and (5) by said network optimization application running on said first communication device, interacting a server relay running on said best server to determine a suitable transporter algorithm for initiating a pathway for transmission for said call via said best server, wherein said server relay is adapted to be deployed on each server within said set of edge servers.

2. The method of claim 1, wherein said server selection optimizer is a regional optimizer and said list of servers are located within a same region as said first communication device.

3. The method of claim 1, wherein said server selection optimizer is a geo optimizer and said list of servers are closest edge servers within said set of edge servers to said first communication device.

4. The method of claim 1, wherein said server selection optimizer determines said list of servers based on said IP address similarity with said IP address of said first communication device.

5. The method of claim 1, wherein said server selection optimizer is an internet service provider (ISP) optimizer, wherein:
  a. said access controller is adapted to determine an ISP based said IP address of said first communication device by querying an IP database; and
  b. said server selection optimizer is adapted to select edge server within said ISP as said list of servers.

6. The method of claim 1, wherein said network optimization application determines said suitable transporter algorithm with testing algorithms that include at least one of retransmission on lost, FEC, simultaneous path, very low bitrate encoding, sending of multiple voice frames in one packet, adaptive jitter buffer, and PLC.

7. The method of claim 1, wherein said network optimization application running on said first communication device selects said best server by sending test packets to each server within said list of several best servers and monitoring a response.

8. The method of claim 7, wherein said monitoring a response determines packet loss rate, jitter and packet latency.

9. The method of claim 8, wherein said monitoring a response determines bandwidth.

10. The method of claim 9, wherein said suitable transporter algorithm indicates an optimized packet size.

11. The method of claim 10, wherein said optimized packet size is a largest packet available when below a threshold packet loss rate and below a threshold bandwidth.

12. The method of claim 11, wherein said network optimization application running on said first communication device is further adapted to renegotiate an updated data packet size based upon a change in conditions of said pathway for transmission.

13. The method of claim 11, wherein said network optimization application running on said first communication device is further adapted to interact with said last mile optimizer on each server within said set of edge servers to determine a second best server while said call is in progress.

14. The method of claim 13, wherein said network optimization application running on said first communication device is further adapted to switch to said second best server when said pathway for transmission has a failure.

15. The method of claim 13, wherein said network optimization application running on said first communication device is further adapted to switch to said second best server when said pathway for transmission has a packet loss rate of above 2% or a latency above 400 ms.

* * * * *